(12) United States Patent
Wagner et al.

(10) Patent No.: US 9,360,740 B2
(45) Date of Patent: Jun. 7, 2016

(54) ACTIVELY STABILIZED PAYLOAD SUPPORT APPARATUS AND METHODS

(71) Applicants: Steven D. Wagner, Belmont, CA (US); Garrett W. Brown, Philadelphia, PA (US)

(72) Inventors: Steven D. Wagner, Belmont, CA (US); Garrett W. Brown, Philadelphia, PA (US)

(*) Notice: Subject to any disclaimer, the term of this patent is extended or adjusted under 35 U.S.C. 154(b) by 224 days.

(21) Appl. No.: 14/267,500

(22) Filed: May 1, 2014

(65) Prior Publication Data

US 2014/0288694 A1 Sep. 25, 2014

Related U.S. Application Data

(63) Continuation-in-part of application No. PCT/US2012/063298, filed on Nov. 2, 2012.

(60) Provisional application No. 61/587,439, filed on Jan. 17, 2012, provisional application No. 61/554,676, filed on Nov. 2, 2011.

(51) Int. Cl.
| | | |
|---|---|---|
| *G06F 7/00* | (2006.01) |
| *G03B 17/56* | (2006.01) |
| *F16M 11/18* | (2006.01) |
| *F16M 13/04* | (2006.01) |
| *F16M 13/02* | (2006.01) |
| *F16M 11/10* | (2006.01) |
| *F16M 11/20* | (2006.01) |
| *F16M 13/00* | (2006.01) |

(52) U.S. Cl.
CPC ............ *G03B 17/561* (2013.01); *F16M 11/105* (2013.01); *F16M 11/18* (2013.01); *F16M 11/2064* (2013.01); *F16M 13/00* (2013.01); *F16M 13/022* (2013.01); *F16M 13/04* (2013.01); *F16M 2200/042* (2013.01); *F16M 2200/044* (2013.01)

(58) Field of Classification Search
CPC ........................... G03B 17/561; F16M 13/002
USPC ....................... 700/213, 245; 318/649; 701/2; G9B/27.01, 27.033
See application file for complete search history.

(56) References Cited

U.S. PATENT DOCUMENTS

| | | | |
|---|---|---|---|
| 2,239,201 | A | 4/1941 | Pyzel |
| 2,945,428 | A | 7/1960 | Dearborn |
| 2,961,877 | A | 11/1960 | Edwards, Jr. |
| 4,033,541 | A | 7/1977 | Malueg |
| 4,774,589 | A | 9/1988 | Rowland |
| 4,989,466 | A | 2/1991 | Goodman |
| 5,202,695 | A | 4/1993 | Hollandsworth et al. |
| 5,274,314 | A | 12/1993 | Maqueira |
| 5,589,828 | A | 12/1996 | Armstrong |
| 5,695,500 | A | 12/1997 | Taylor et al. |
| 5,754,023 | A | 5/1998 | Roston et al. |
| 5,784,966 | A * | 7/1998 | Brown ...................... B61B 3/02 104/118 |
| 5,868,031 | A | 2/1999 | Kokush |

(Continued)

OTHER PUBLICATIONS

Havlena et al. AWEAR 2.0 System Omni directional Audio Visual Data Acquisition and Processing, 2009, IEEE, p. 49-56.*

(Continued)

*Primary Examiner* — McDieunel Marc
(74) *Attorney, Agent, or Firm* — Barnes & Thornburg LLP; Joan T. Kluger

(57) ABSTRACT

A payload stabilizer suitable for use with video camera payloads. The stabilizer has a feedback system providing supplemental torques to the payload through a gimbal while remaining responsive to direct operator control.

23 Claims, 9 Drawing Sheets

(56) References Cited

U.S. PATENT DOCUMENTS

| | | | |
|---|---|---|---|
| 5,963,749 A | 10/1999 | Nicholson | |
| 6,563,532 B1 * | 5/2003 | Strub | G11B 27/031 348/158 |
| 6,825,875 B1 * | 11/2004 | Strub | G11B 27/031 348/158 |
| 7,209,176 B2 | 4/2007 | Chapman | |
| 7,511,738 B1 | 3/2009 | Kancler et al. | |
| 7,642,741 B2 | 1/2010 | Sidman | |
| 8,100,591 B2 | 1/2012 | Chapman | |
| 8,142,083 B2 | 3/2012 | Brown | |
| 8,179,078 B2 | 5/2012 | Sidman | |
| 8,903,568 B1 * | 12/2014 | Wang | B64C 19/00 244/189 |
| 8,908,090 B2 * | 12/2014 | Webb | H04N 5/2328 348/373 |
| 8,938,161 B2 * | 1/2015 | Webb | G02B 27/646 396/421 |
| 2004/0156616 A1 * | 8/2004 | Strub | G11B 27/031 386/224 |
| 2005/0052531 A1 | 3/2005 | Kozlav et al. | |
| 2007/0050139 A1 * | 3/2007 | Sidman | F16M 11/041 318/649 |
| 2008/0034954 A1 | 2/2008 | Grober | |
| 2008/0046122 A1 | 2/2008 | Manzo | |
| 2009/0022369 A1 * | 1/2009 | Satoh | G01B 21/04 382/106 |
| 2009/0086015 A1 | 4/2009 | Larsen et al. | |
| 2009/0086059 A1 | 4/2009 | Sambongi et al. | |
| 2010/0079101 A1 * | 4/2010 | Sidman | F16M 11/041 318/649 |
| 2010/0238345 A1 | 9/2010 | Greb et al. | |
| 2011/0007157 A1 | 1/2011 | Sekelsky et al. | |
| 2011/0080563 A1 | 4/2011 | Greaves et al. | |
| 2011/0169972 A1 | 7/2011 | Maldonad | |
| 2011/0211164 A1 | 9/2011 | Monroe et al. | |
| 2011/0221900 A1 | 9/2011 | Reich | |
| 2014/0270744 A1 * | 9/2014 | Webb | H04N 5/2328 396/55 |

OTHER PUBLICATIONS

International Search Report dated Jan. 31, 2013 for PCT/US2012/063298.
Written Opinion of the International Search Authority dated Jan. 31, 2013 for PCT/US2012/063298.
Zdenek Hurak, Martin Rezae, Combined line-of-sight inertial stabilization and visual tracking, Joint 48th IEEE Conference on Decision and Control, Dec. 18, 2009, United States.
Supplementary European Search Report for European Application No. 12844991.5 dated Jul. 27, 2015.

* cited by examiner

ACTIVELY STABILIZED PAYLOAD SUPPORT APPARATUS AND METHODS

This application is a continuation-in-part of International Application PCT/US2012/063298, with an international filing date of Nov. 2, 2012, which claims priority to U.S. Provisional Patent Application Ser. No. 61/554,676, filed Nov. 2, 2011, and U.S. Provisional Patent Application Ser. No. 61/587,439, filed Jan. 17, 2012.

BACKGROUND OF THE INVENTION

This invention relates generally to inertial stabilizing devices and to methods therefore, and is applicable to payloads such as image capture devices including portable video and film cameras.

Mobile film or video cameras typically require angular and spatial stability in order to obtain smooth, high-quality results. One type of stabilizer is a passive inertial camera stabilizer. Passive inertial camera stabilizers reduce or avoid unwanted angular and spatial motion, while also benefiting from the accuracy and ease-of-use associated with direct operator control. Passive inertial stabilizers are used to support a variety of cameras including, for example, light-weight hand-held cameras and large cameras. Most such stabilizers require significant training time and effort to become technically proficient in their use/effectively use. In particular, passive stabilizing systems for light-weight cameras with more compact structures can face reduced moments of inertia, thus demanding even greater skill and technique for effective use.

Although a variety of camera stabilization systems are available, challenges still remain in providing accurate and consistent stabilization control of payload platforms. Particularly, there is a need for an active stabilizer system for use with miniaturized/lightweight cameras which still benefits from the passive inertial stability and direct operator control of earlier stabilizers. It is desirable to have added ease of use, enhanced controllability, extra stability, and inherently level horizon of the well accepted fluid-damped pan-tilt head and its associated support tripod or dolly.

SUMMARY OF THE INVENTION

A support and orienting apparatus is disclosed for use with a payload such as a video camera. Embodiments of the invention include some or all of the following features:

supplemental active counter torques applied to the payload through the existing support gimbal while remaining responsive to direct operator contact to guide and orient the supported balanced expanded payload.

direct operator control of an actively stabilized three axis platform: such three axis apparatus are never touched directly by an operator during actual use, invariably they are remotely steered electronically by an operator employing a remote control interface typically a joystick or the like.

increase in the moment of inertia of the supported expanded payload without adding weight, spinning flywheels, or increasing the size, said inertia increased by providing supplemental counter torques to the expanded payload through the gimbal, said torques being proportional to and in opposition to external torques intentionally applied by the operator or through disturbances, resulting in reduced angular error compared to an equivalent weight and size passive stabilizer.

a dynamic friction referenced to a stationary inertial frame producing a resistive feedback torque which increases with angular rate and is felt by the operator as he or she applies torque to rotate the orientation of the expanded payload. Said dynamic friction beneficially damps excessive operator torque impulses and external disturbances such as wind friction allowing more fluidic and uniform pan and tilt movements, users possibly finding this feature beneficial particularly with "zoomed in" or telephoto shots where angular disturbances are magnified.

a static frictional torque feedback, referenced to a stationary inertial frame, such that when a particular pan and tilt orientation is achieved by direct operator control and the device is stationary, it will tend to maintain that orientation once the operator has released control of the operator control surface attached to the payload and even when slightly unbalanced or disturbed by an external force.

feedback torques through the gimbal to the expanded balanced payload, said torques directed to align the payload's axis of tilt to be substantially parallel to the local horizon, or equivalently, perpendicular to a measure of the direction of gravity, even as the operator continues to apply pan and tilt torques to orient the payload. Said tilt axis alignment feature providing the inherently level framing characteristics of the ground based tripod equipped with a pan tilt head despite the present invention being freely hand or body carried by an operator.

application of the supplemental torques described above such that the stabilizer operates relatively unobtrusively; an operator using it will preferably be unaware that it is actively stabilized, instead it operates as directly as the passive stabilizers but with the familiar operator feedback and recognized controllability of a conventional fluid-damped pan tilt head on a tripod or dolly for example.

achieving the aforementioned elements without adding significant mechanical complexity beyond that of conventional passive stabilizers, relying instead on relatively compact and lightweight electronics such as solid state inertial sensors, programmable digital signal processing controllers, torque actuators from the disk drive industry, and other electronic components.

The invention includes a method of stabilizing a balanced component assembly having a plurality of torque generators. In an illustrative embodiment of the invention, the method includes the following steps:

(a) using an angular motion sensing unit measuring and providing angular rates and orientation motions of the balanced component assembly about three substantially mutually orthogonal axes, wherein such angular rates and orientation motions include that which is produced by operator input and external disturbances;

(b) providing a physical model comprising desired angular rates and orientation motions for the three substantially mutually orthogonal axes;

(c) comparing using a signal processor the measured angular rates and orientation motions to the modeled angular rates and orientation motions, respectively, for each of the three substantially mutually orthogonal exes, to create a comparison for each of the substantially mutually orthogonal axes;

(d) generating a supplemental torque signal for each of the substantially mutually orthogonal axes based on the respective comparisons;

(e) applying each of the supplemental torque signals to a respective torque generator;

(f) repeating step (a) through (e) to form a feedback loop.

The three mutually orthogonal axes can correspond to pan, tilt and roll, for example. Separate algorithms can be used for each of the substantially mutually orthogonal axes to create a comparison of the measured angular rates and orientation motions to the modeled angular rates and orientation motions. The supplemental torque signal may increases the angular inertia of the balanced component assembly.

Static torque and frictional torque referenced to a fixed inertial frame can be added to the modeled tilt torque and modeled pan torque of the physical model. The moment of inertia and coefficient of dynamic braking friction can be automatically reduced over time as a function of increasing measured angular rate about each substantially mutually orthogonal axis.

The method may include providing a threshold torque below a supplemental torque limit and reducing the supplemental torque when the external torque reaches the threshold torque, thereby signaling an operator to reduce operator torque input. When the external torque departs from the threshold torque, supplemental torque is re-applied.

Embodiments of the invention include an apparatus for stabilizing a payload comprising a rig having an omni-axial torque generator comprising a roll torque generator, a tilt torque generator and a pan torque generator; a feedback controller; the omni-axial torque generator driven by a supplemental torque output signal generated by the feedback controller; an angular motion sensing unit capable of measuring angular rates and orientation motions produced by the omni-torque generator wherein the angular rates and orientation motions include that which is produced by operator-input and external disturbances; the feedback controller having a signal processor functionally connected to the angular motion sensing unit to receive as an input the measured rates and measured orientations. The signal processor includes an artificial horizon algorithm, a roll axis algorithm, a tilt axis algorithm and a pan axis algorithm. The signal processor, by the respective algorithms, is capable of processing the measured angular rates and orientation motions to produce the supplemental torque signals to be applied to each of the pan, tilt and roll axis, which when applied modify the angular rates and angular positions to conform to a physical model.

The apparatus has an operator-control surface for controlling motion about the pan axis and the tilt axis, wherein motion about the roll axis is controlled by the feedback controller only.

A handle assembly is included which may allow the shell to be substantially unlimitedly rotatable about a pan axis output shaft without twisting the wires.

DESCRIPTION OF THE DRAWINGS

The detailed description refers to drawings briefly described here.

DETAILED DESCRIPTION OF THE INVENTION

Embodiments of the invention include an arrangement of four interdependent sub-assemblies coupled in an interconnected continuous feedback loop fashion. The sub-assemblies include:

1: "Balanced Component Assembly"

The balanced component assembly includes a so called "SLED" structure. An illustrative sled structure is described in U.S. Pat. No. 4,017,168, where it is designated as "equipment for use in hand held photography". Co-inventor Garrett Brown of the present invention is also the inventor designated on the aforementioned patent. The sled structure will be referred to herein in an abbreviated manner as a rig or stabilizer. The stabilizer together with a payload, such as a camera and related equipment, will be referred to as a "balanced component assembly".

Figure 1:
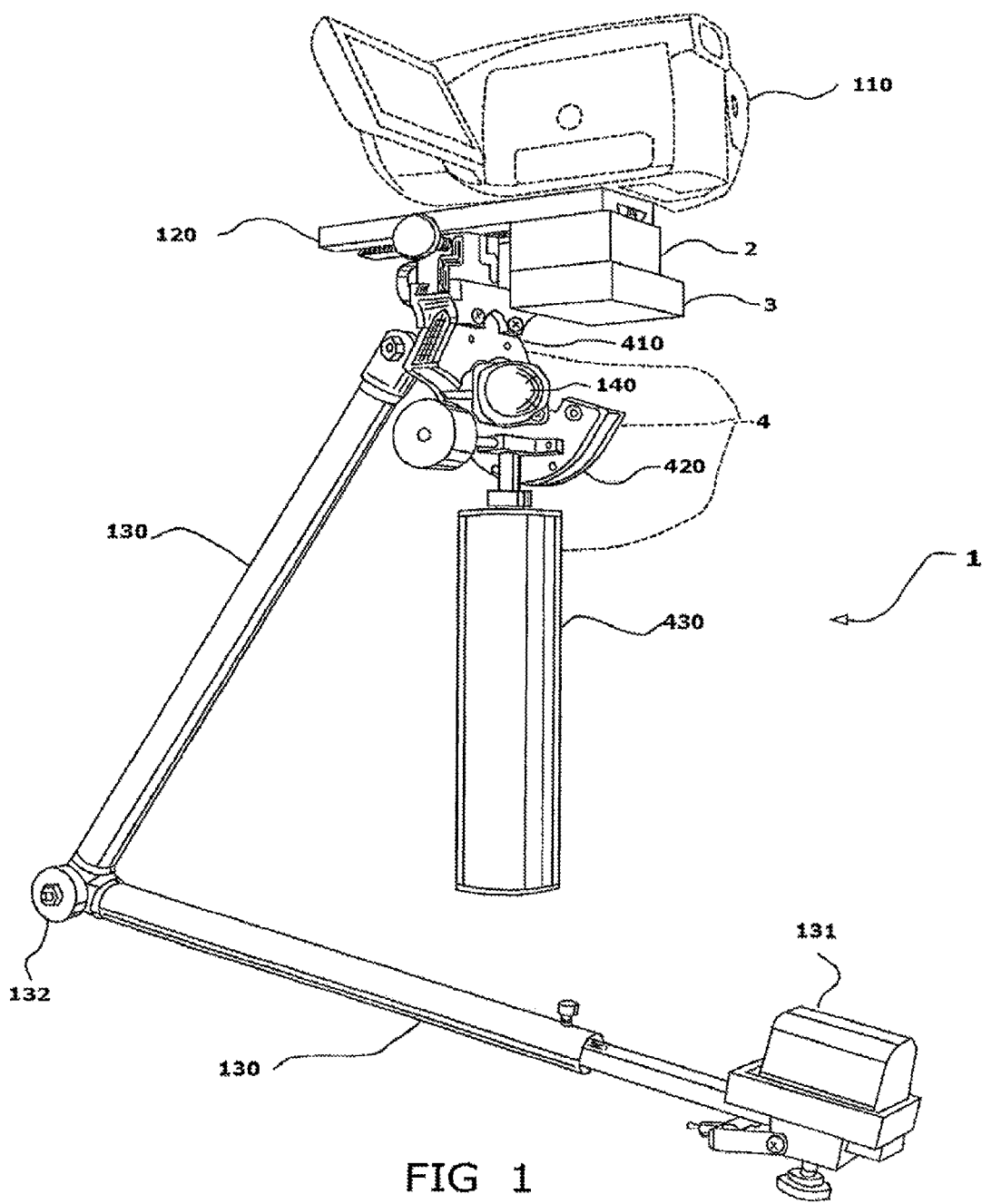
FIG. 1 depicts a stabilizer according to an illustrative embodiment of the invention.

FIG. 1 depicts a balanced component assembly according to an illustrative embodiment of the invention. Stabilizer 1 comprises a platform 120 for supporting a camera payload 110 or other payload to be oriented; said platform is coupled to a stiff space-frame 130 extending away from and below the camera platform. At the distal end of said coupled space-frame are counterweights often consisting of useful components such as a battery 131 and/or a video monitor or simple counter-balance weights 132. The balanced component assembly has a shifted center of gravity (CG) outside and below the supported payload's natural center of gravity where we can place an omni axial gimbal comprising a roll axis torque generator 410, a tilt axis torque generator 420 and a pan torque generator 430, or other mutually perpendicular set of axes. Said gimbal transfers the weight of the balanced structure to an external support, such as a handle, which is part of the pan torque generator 430, while allowing free rotation of the balanced component assembly about its CG, preferably around any and all possible rotational axes with respect to the external support's orientation. Attached to the balanced component assembly near its CG is an operator control or "guide" 140 to which the operator may apply steering torques to the "sled" to point/guide the supported camera to frame the subject to be captured, for example.

As will be shown, embodiments of the invention build upon and may add inertial stability to traditional balanced Steadicam®-type or other stabilizing structures of stabilizer 1 and work cooperatively with and may use to its advantage natural passive angular inertia therein. Existing actively stabilized mounts try to minimize inertia of the camera payload and thus may require more accurate and possibly expensive inertial sensors, higher bandwidth and potentially less stable feedback control and more precise physical structures to achieve the same level of angular stability. Conventional actively stabilized mounts may also be more limited as to the size and weight of the supported camera.

Illustrative embodiments of the inertial enhancement feature are particularly applicable to the newer smaller, lighter, and lower inertia rigs such as the Steadicam Merlin® sold by The Tiffen Company LLC. As will be shown, illustrative embodiments of the invention multiply angular inertia, which may make these small rigs less susceptible to wind disturbance and inadvertent operator input, possibly making them perform like larger/heavier rigs without adding significant weight/size.

Referring again to FIG. 1, attached to and responsive to the "sled" is the next component, namely:

2: "Angular Motion Sensing Unit".

Angular motion sensing units, such as inertial measurement units (IMUs), for example, typically measure the angular rotation rates and linear accelerations and the orientation with respect to gravity of the objects or vehicles to which they are attached. In an illustrative embodiment of the invention a so called "six degree of freedom" angular motion sensing unit is employed measuring the composite angular rotation rate of the attached "sled" plus camera about three substantially mutually orthogonal axes by so called "angular rate sensors" and the spatial acceleration along three linear and mutually orthogonal axes via accelerometers. The three angular rate sensors are typically mounted in alignment with the camera's "roll", "tilt" and "pan" axes of rotation. The linear accelerometers of the angular motion sensing unit are typically aligned along the camera's "up-down", "left-right" and "fore-aft" axes. The accelerometers respond to actual linear acceleration through space as well as the static acceleration due to gravity, the latter useable to detect the steady state angles of orientation of the camera payload referenced to earth based "vertical/horizontal" directions.

According to illustrative embodiments of the invention, the angular motion sensing unit preferably estimates all possible motions of the sled plus camera payload and allows development of stabilizing counter-torques via the feedback controller algorithms described below.

The terms "stabilizing counter torques", "counter torques", "supplemental torques", "correctional torques", "stabilizing torque signals" are used interchangeably throughout the description, all being torques applied actively through the gimbal's attached omni-axial torque generator to achieve the claimed stability improvements.

By estimating the balanced component assembly's rotation via the angular rate sensors and its gravitational orientation via the accelerometers, the algorithms have information signals required to develop stabilizing counter torques creating the stabilizing adjustments developed by the next subassembly, of FIG. 1 which is responsive to the angular motion sensing unit, namely:

3: The Signal Processor and its Supported Feedback Controller, and the Combination of Both Algorithmic Methods that it Supports:

In summary, the Feedback Controller 3 receives motion signals from the angular motion sensing unit subassembly 2 and through a combination of algorithms produces stabilizing counter torque signals. These counter torque signals are converted to physical torques with the omni-axial torque generator 4, comprising for example three individual torque generators 410, 420, 430 responsive to said stabilizing counter torque signals. Torque generators 410, 420, 430 produce torques about the roll axis, tilt axis, and pan axis, respectively. The angular motion sensing unit measures the resulting rotational orientation and rates and produces representative signals that are fed back to the feedback controller to complete a feedback loop producing the desired stability.

The Feedback Controller 3 and its algorithms, which is responsive to the angular motion sensing unit subassembly 2 of FIG. 1 and co-located with the camera payload 110, monitor the maximum supplemental torques available to be generated and coupled between the payload (camera) side of the gimbal and the operator side, synthesizes an inertial enhancement, static and dynamic frictional, and leveling torques and combines them so that the operator experiences them at the control guide 140 of the stabilizer in a preferably substantially natural way such that he/she may be unaware that the unit is actively stabilized. In an exemplary embodiment of the invention, the device may feel as familiar as a passive stabilizer but with the stability enhancement features happening transparently and additively to the physical rig's natural passive feel.

Preferably, embodiments of the invention provide the operator the same familiar "hands on" way to orient the balanced component assembly while the Feedback Controller acts simultaneously and cooperatively to enhance or otherwise modify stability.

The Feedback Controller 3 hardware supporting the algorithms is implemented by a so called "real time signal processor". Earlier "real time signal processors" comprised an analog electronic computing circuit or a mechanical computer but in recent practice they are more typically a specialized digital computer known as a "digital signal processor". In any case "real time" means that the processor will receive input signal(s), act upon them with the algorithms and produce a final result with a delay short enough that it will not negatively affect the stability or performance of the Feedback Controller and its controlled structure.

Figure 2:
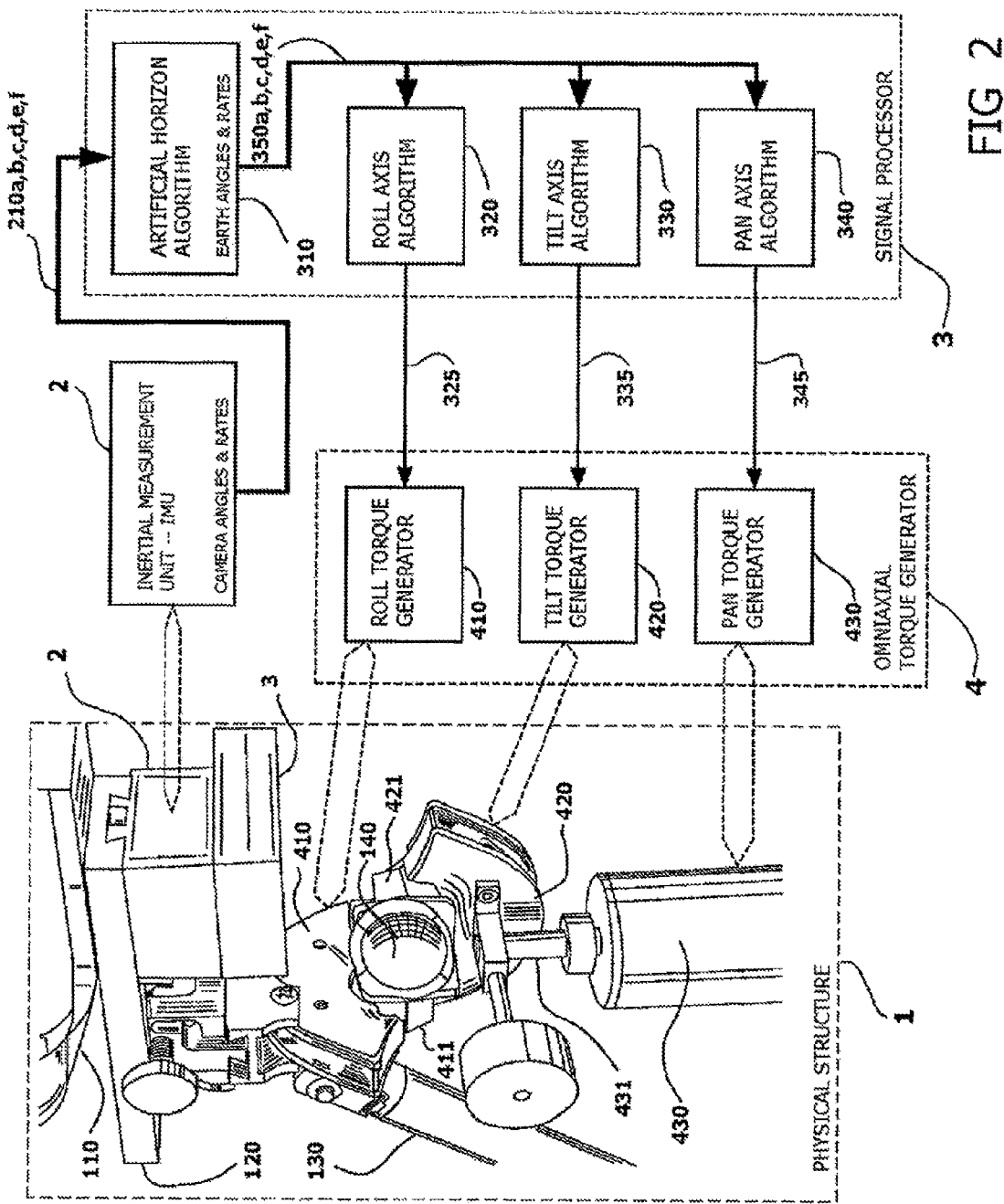
FIG. 2 is a block diagram of an illustrative embodiment of the invention and depicts the correspondence to an illustrative physical structure.

In an illustrative embodiment of the invention, processed in the first part of the Feedback Controller 3 algorithm combination are angular motion sensing unit 2 sensor signals using or based upon algorithms such as those variously known in the art as "vertical gyro", "artificial horizon" or "attitude and heading reference system (AHRS)" algorithms, referred henceforth to as an "artificial horizon" algorithm 310 of FIG. 2. This algorithm receives the "vehicle referenced" (in this illustrative case, camera payload referenced) signals, such as 210a, b, c, d, e, f from the camera payload attached inertial sensors and converts them to "earth-referenced" signals, such as 350a, b, c, d, e, f that are useable (preferably directly) by the subsequent algorithms. By earth-referenced we mean that the artificial horizon algorithm 310 produces motion signals that represent the roll/pitch/yaw rates of rotation and absolute angular orientation of the camera payload with respect to the earth and in particular with respect to a plane that is parallel to the earth's local horizon and thus is perpendicular to the direction of local gravity. As applied to orienting a camera, as opposed to an air or space vehicle, the equivalent terms "roll/tilt/pan" are used instead of "roll/pitch/yaw" rates and absolute angles.

A well implemented artificial horizon algorithm will accurately estimate absolute earth based tilt and roll angles of the supported camera despite lateral acceleration motions. A simple "spirit or bubble" level as is commonly used by the operator to assist in the leveling of a balanced component assembly may not as reliable.

This can be likened to creating a virtual "stable table," upon which the camera platform can be virtually mounted, facilitating stability enhancements, such as those described next.

Note that the terms "inertia", "angular inertia", and "moment of inertia" are used interchangeably throughout this description. Since key aspects of the invention deal only with angular stabilization they all are intended to mean the same thing.

Stability Enhancement Algorithms implementation explained:

According to embodiments of the invention, referring now to FIG. 2, we subdivide and implement the remaining algorithmic methods in three parallel paths each assigned to a particular axis of rotation of the stabilizer 1 and each producing a corrective torque applied through a corresponding axis of the omni-axial torque generator 4 attached to the gimbal of the stabilizer 1, namely:

(1) Roll Axis Algorithm 320—implements the horizon leveling feature by applying correctional torque through the roll axis of the gimbal mounted torque generator 410.

(2) Pan Axis Model Follower Algorithm 340—implements the pan inertia enhancement plus static and dynamic frictions for this axis by applying correctional torque through the pan axis of the gimbal mounted torque generator 430.

(3) Tilt Axis Model Follower Algorithm 330—implements the tilt inertia enhancement plus static and dynamic frictions for this axis by applying correctional torque through the tilt axis of the gimbal mounted torque generator 420.

It is noted that "roll", "pan" and "tilt" are used for illustrative purposes, but as mentioned earlier, they can be replaced by other mutually perpendicular axes.

This algorithmic separation allows us to apply stability corrections of different strengths to each axis, which is advantageous because typical prior art balanced stabilizing rigs may exhibit various amounts of natural angular inertia about each primary axis of rotation. For example the tilt and roll axis inertia is usually greater than the pan inertia due to the typical sled being somewhat taller than it is deep or wide. Illustrative embodiments of the invention may create a stabilized rig that may equalize the angular inertia among all axes as perceived by the operator at the control handle/guide if desired.

Figure 5:
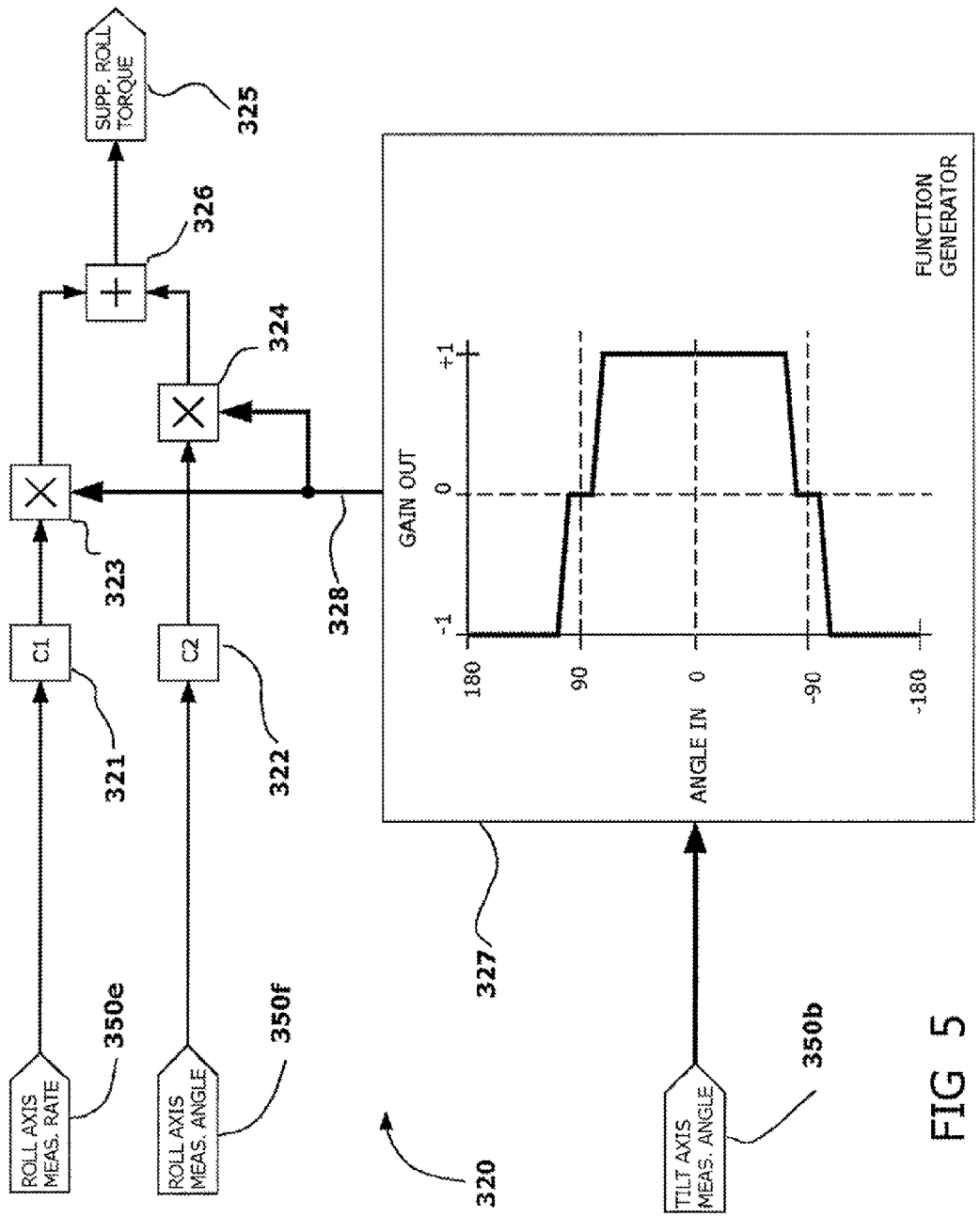
FIG. 5 is a signal processing block diagram of an algorithm applicable to stabilize the roll axis according to an illustrative embodiment of the invention.

Detailed Description of the Stabilizing Algorithms for Each Axis:

Roll Axis Algorithm 320 of FIG. 2, FIG. 5—Horizon leveling:

The Roll Axis Algorithm 320 according to an illustrative embodiment of the invention provides, with no additional moving parts to the assembly 1, a horizon leveling feature. Operators of traditional stabilizers dedicate significant mental effort in keeping it level. Having this low level chore done automatically frees the operator to concentrate on the framing of the camera move at hand and navigating through the set to achieve the shot. Furthermore, since the leveling feature is provided through active gimbal torques, the balanced component assembly comprising stabilizer 1 may be neutrally balanced instead of bottom-heavy as is the custom. Advantageously, in an exemplary embodiment of the invention, an operator may tilt at will without fighting the constant torque of a bottom-heavy rig resulting in more stable framing at larger tilt angles. Importantly, the roll axis algorithm 320 causes the horizon leveling to be maintained over all or many practical tilt angles and while panning at all or many practical speeds.

Illustrative embodiments of the invention may mimic the inherently level horizon of a ground-based and leveled tripod or dolly plus camera attached to a standard pan-tilt mount. Such an arrangement allows an operator to frame and follow a subject by pushing on a so called pan-tilt handle, freely "panning and tilting" to capture the subject all while the camera's horizon remains automatically level thus of no concern to the operator. By construction and set-up, the tilt axis of a ground-based mount is typically parallel to the ground so the mounted camera typically remains level.

Referring to FIG. 5, the aforementioned feature is achieved using two signals provided by the artificial horizon algorithm 310: roll axis measured rate 350*e* and absolute roll axis measured angle 350*f* referenced to earth. The roll angle is arranged to read zero when the camera is level (tilt axis is horizontal) and to read positive when the camera is non-level clockwise, negative when non-level counterclockwise. Similarly, the roll rate is zero when the camera is not rotating about the roll axis, positive if in motion rotating clockwise, negative if in motion rotating counterclockwise about the roll axis. We scale each of these signals by selected scale factors C1, C2 respectively (321, 322) and sum them with adder 326 to create a 'roll counter torque' feedback signal 325 applied through the gimbal mounted roll torque generator 410. With properly selected scale factors we create a rapidly responsive feedback loop that coaxes the rig plus camera back to level despite external disturbances.

Pan and Tilt axis Algorithms—Enhanced Inertia plus Static and Dynamic Frictions, referring to FIG. 2:

In addition to inertial enhancement, the pan and tilt axis algorithms 340, 330 add to a stabilizer assembly productive features from the standard ground-based camera's fluid damped pan-tilt head, namely dynamic and static friction, importantly referenced to a fixed inertial frame provided by the artificial horizon algorithm 310. Static friction helps the camera operator maintain a fixed pan/tilt orientation—so called "lock-off" with minimal effort. Dynamic friction enhances slow pan and tilt smoothness particularly with long (telephoto) lenses. Both these synthesized frictions also help attenuate camera disturbances due to wind gusts and excessive operator input to the guide 140.

The algorithms that handle the pan and tilt axes may be identical but may employ different inertia, static friction, and dynamic friction objectives, creating a separately controllable desired response for each axis.

The tilt axis model follower algorithm 330 is responsive to the artificial horizon algorithm 310 provided angular tilt rate 350*a* and absolute tilt angle 350*b* and produces a supplemental tilt torque 335 applied through the omni-axial torque generator's tilt axis via tilt torque generator 420.

Similarly, the pan axis model follower algorithm 340 is responsive to the artificial horizon algorithm 310 provided angular pan rate 350 and pan angle 350*d* and produces a supplemental pan axis corrective torque 345 applied through the omni-axial torque generator's pan axis via pan torque generator 430.

Note that pan angle is relative to an arbitrary starting position and is not absolute as with roll/tilt since the artificial horizon algorithm gives no absolute indication as to which direction the camera is pointing pan-wise without a compass or the like. The pan axis algorithm accounts for this by computing corrective torques based on changes in pan angle not absolute pan angular direction.

Figure 3:
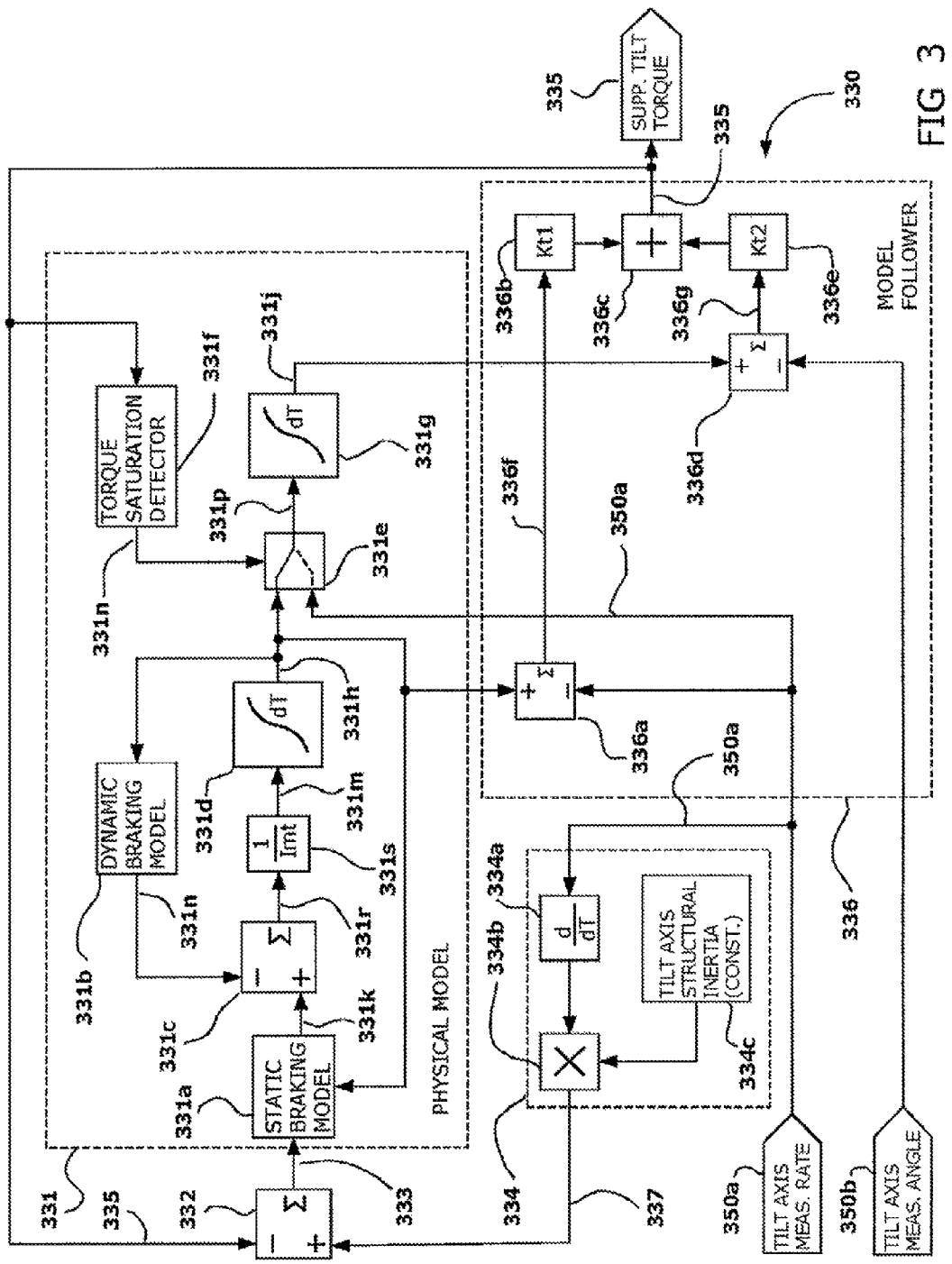
FIG. 3 is a signal processing block diagram of an algorithm applicable to stabilize the tilt axis according to an illustrative embodiment of the invention.
Figure 4:
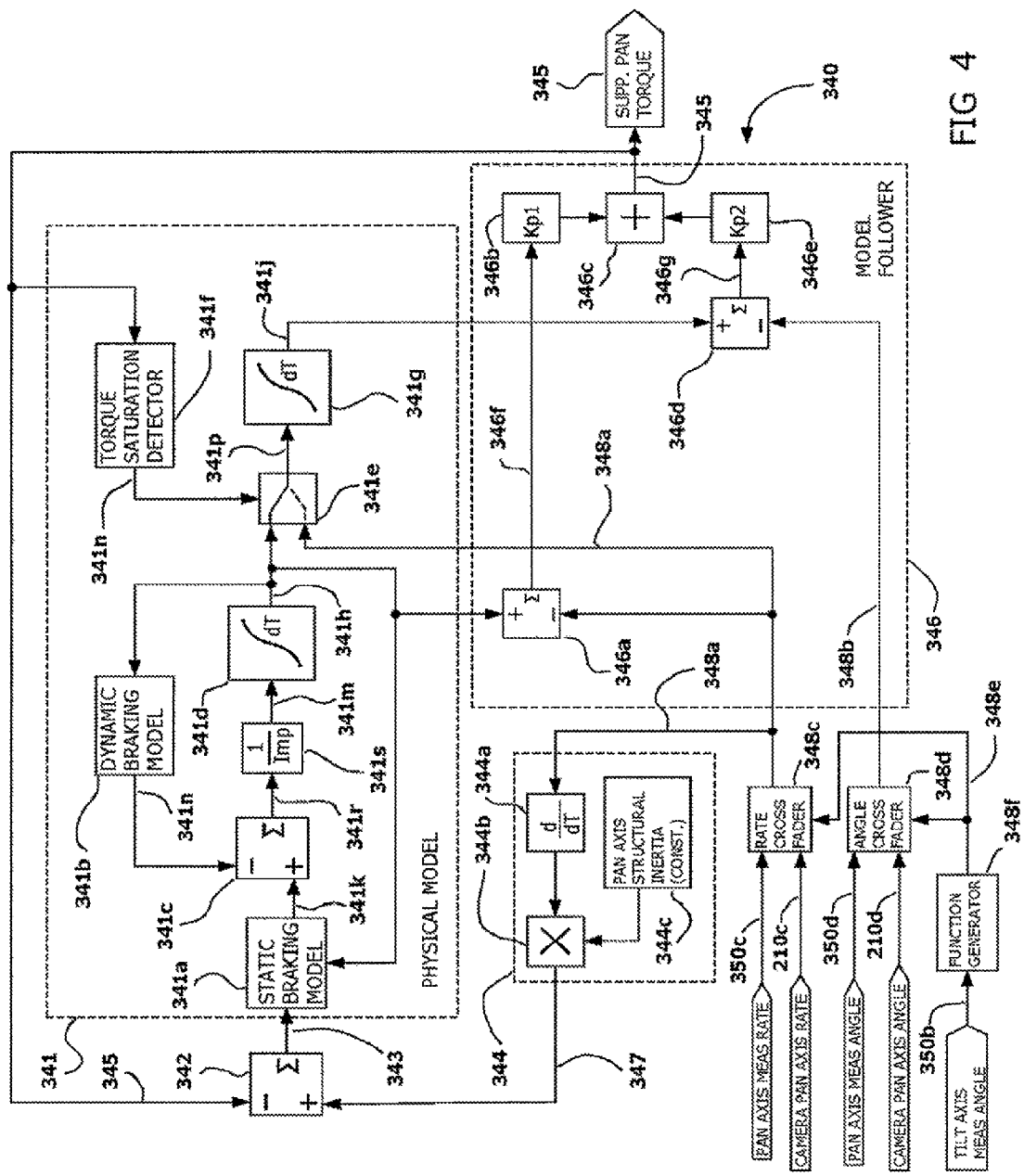
FIG. 4 is a signal processing block diagram of an algorithm applicable to stabilize the pan axis according to an illustrative embodiment of the invention.

Pan/Tilt axis algorithm detailed description, referring now to FIG. 3 and FIG. 4:

Synthesized inertial enhancement plus beneficial frictions are added to the pan and tilt axes of a passive balanced component assembly. Algorithms for the pan and tilt axis simulated physical models 341, 331 are employed plus pan and tilt axis model followers 346, 336 are employed. The basic technique comprises building a real time simulation of an idealized model that mimics the physics of the desired enhanced balanced component assembly within the signal processor. The simulated balanced component assembly is driven by an estimate of net external pan/tilt torques signals 343, 333 applied to the actual passive balanced component assembly. The simulated balanced component assembly's computed desired motions are then compared to the actual passive balanced component assembly's measured motions and correctional feedback torques are developed that coerce the physical balanced component assembly's motions to match those of the simulated one. If the omni-axial torque generator 4 is powerful enough and the bandwidth of the feedback loop is high enough, the balanced component assembly will generally closely match (and possibly feel nearly identical for the operator) to the idealized simulated model.

A simple physical mechanism that models the desired inertia feature is a flywheel mounted on a low friction bearing. The simulated flywheel obeys Newton's laws of rotational motion: If stationary (not rotating) it remains so unless acted upon by an applied external torque. If rotating, it continues at a constant angular rate (in degrees per second for example), either clockwise (CW) or counterclockwise (CCW) unless acted upon by an applied external torque. The flywheel has only two states of being versus time, also known simply as "states": its current rotational rate (a positive CW value, or a negative CCW value, or zero in degrees per second) and current angular position in degrees. If a constant torque is applied to the stationary flywheel it begins to rotate from zero at an ever increasing angular rate, i.e. it angularly accelerates in proportion to the applied torque divided by the flywheel's modeled moment of inertia. Equivalently, its angular rate increases uniformly over time from zero. If a negative torque is applied to the flywheel it decreases its angular rate uniformly for the time that the torque is applied, eventually stopping then reversing direction if the negative torque persists long enough.

Newton also relates angular position to angular velocity: for example if the flywheel is rotating at a constant rate of one degree per second its angular position advances one full turn in 360 seconds or two full turns in 720 seconds, etc.

The behavior of the modeled inertial flywheel, (i.e. torque input over time produces angular rate over time and angular position over time outputs) can be encapsulated in the following equation set:

Angular rate over time=(integral of [torque in] over time)divided by moment of inertia.

Angular position over time=integral of angular rate over time. Note that the "integral over time" of a time variable quantity is simply the "area under the curve" accumulated below that quantity plotted on a graph versus time, starting at time zero and ending at the current time. The signal processor uses the accepted integrator or accumulator for this function.

Referring to FIG. 3, we describe the above equation implementation for the tilt axis simulated physical model 331: Torque signal 331r is divided by desired moment of inertia Imt by divider 331s producing modeled tilt angular acceleration 331m. Integrator 331d integrates over time said modeled tilt angular acceleration 331m producing modeled tilt rate signal 331h, passed to second integrator 331g, which integrates it over time to produce modeled tilt angle 331j.

Similarly for the pan axis, referring now to FIG. 4: Torque signal 341r is divided by desired moment of inertia Imp by divider 341s producing modeled pan angular acceleration 341m. Integrator 341d integrates over time said modeled pan angular acceleration 341m producing modeled pan rate 341h, passed to second integrator 341g, which integrates it over time to produce modeled pan angle 341j.

The desired simulated static and dynamic frictional torques are now added to the simple inertia only flywheel model. This is equivalent to adding a 'brake' to the flywheel. Said brake applies a new opposing torque to the model. If the current angular velocity of the model is zero, we apply a 'static friction' holding torque which matches and preferably completely opposes (is subtracted from) all external torques input to the model up to a set threshold. When external torque applied to the model approaches the set threshold we gradually 'release the brake' (gradually remove the holding torque) allowing the model to begin angularly accelerating in response to the full external torque. When the angular velocity approaches zero the model gradually reapplies the 'static friction' brake. This results in a braking torque coupled from the camera side through the gimbal to the support side via the omni-axial torque generator 4 and its controlling algorithms as will be described.

Referring to FIG. 3 for the tilt axis; a static braking model 331a responds to net external tilt torque signal 333 and as described either passes it directly as tilt torque signal 331k, when modeled tilt rate signal 331h is nonzero, or passes torque of zero to tilt torque signal 331k when tilt torque signal 333 is less than a selected threshold while modeled tilt rate signal 331h is nominally zero.

Referring to FIG. 4 for the pan axis; a second static braking model 341a responds to net external pan torque signal 343 and as described either passes it directly as pan torque signal 341k, when pan modeled rate signal 341h is nonzero, or passes torque of zero to pan torque signal 341k when net external pan torque signal 343 is less than a second selected threshold while modeled pan rate signal 341h is nominally zero.

In parallel to the static friction brake we employ a simulated dynamic friction braking component. This is achieved by adding a dynamic negative feedback torque to the input of the model in opposition to the external torque input. Said dynamic negative torque is achieved simply by creating and applying a new torque in scaled proportion to the current angular rate of the model and subtracting said new torque from the external torque input with the difference applied to the model. A scale factor, also known as the 'coefficient of dynamic braking' controls the strength of the dynamic braking effect and when increased is comparable to tightening the 'drag adjusting knob' of a conventional passive fluid damped pan-tilt camera mount.

As a result, the dynamically braked flywheel model responds quite differently to torque input than does the inertia only version. Said inertia only version accelerates continuously with ever increasing angular rate given a constant torque input. With the dynamic braking applied the model angularly accelerates until dynamic braking negative torque equals external torque resulting in preferably net zero torque to the model which thus settles into constant angular rate motion. This closely models the desirable performance characteristic of the fluid damped pan tilt mount.

For the tilt axis, dynamic braking model 331b responds to the current modeled tilt rate signal 331h, scaling it by a 'tilt axis coefficient of dynamic braking' and produces a tilt dynamic braking torque 331a, which is subtracted from static braking model 331a modified tilt torque signal 331k using subtractor 331c.

For the pan axis, dynamic braking model 341b responds to the current modeled pan rate signal 341h, scaling it by a 'pan axis coefficient of dynamic braking' and produces a dynamic braking torque 341n which is subtracted from static braking model 341a modified pan torque signal 341k using subtractor 341c.

According to an illustrative embodiment of the invention, a novel modification to the described dynamic braking feature comprises adjusting the 'coefficient of dynamic braking' as a function of rig rotational rate. For instance we would normally apply maximum dynamic braking for low rotational rates, which typically occur for slow pan and tilt moves called for when using a long (telephoto-type) lens. On the other hand the natural "friction free" behavior of a traditional passive rig allows very fluid rotating pan and tilt moves launched by the operator by applying some torque to the rig and simply letting go to let it 'coast' to follow a subject. If we gradually reduce the dynamic braking coefficient to zero above a certain axial rotation rate we can accommodate this type of operator move without losing beneficial friction enhanced low pan/tilt rate stability. Thus, the 'coefficient of dynamic braking' implemented by dynamic braking models 331b, 341b of the tilt and pan axis algorithms, respectively, may be a non-linear function of the respective modeled rates 331h, 341h rather than a simple proportional scaling constant.

Further, according to the illustrative embodiment of the invention, and as stated earlier, for the tilt and pan axis simulated physical models 331, 341 to respond as actual passive structures would, they must respond (be driven by torques) as is the stabilizer assembly 1. That is, the models should only respond to torques applied by the operator to the control guide 140 and/or by external disturbances such as wind/air resistance and imbalance torque. Importantly, the model should not respond to the torques applied through the omni-axial torque generator 4 to which the physical rig 1 is also responsive. In other words, the model should not be driven with the total torque derived from the motion signals provided by the artificial horizon algorithm, as it is responsive to all torques the physical rig feels (since the angular motion sensing unit is fixed to the rig), including the supplemental torque, thus, it is termed "Total Torque". A "Net External Torque" representing the operator input and external disturbances should be the only driver of the model.

According to this illustrative embodiment of the invention, the axis algorithm has enough information to accurately estimate this quantity. We first estimate Total Torque by differentiating the axis (pan or tilt) angular rate from the artificial horizon algorithm (that is estimate the slope of the rate signal versus time). This differentiator output is a measure of angular acceleration about the axis. Again using one of Newton's laws we produce:

"Total Torque"="Structural Moment of Inertia" times "angular acceleration"

Where the "Structural Moment of Inertia" is a known physical constant value that need only be measured once for the particular physical rig axis we are controlling.
We also know the "supplemental torque" generated through the omni axial torque generator about the axis, since it is generated and applied as the final result of this axis algorithm, thus:

"Net External Torque"="Total Torque" minus "supplemental torque" for each axis.

This is the value applied to the simulated physical model. This completes a model with the desired inertial and frictional characteristics, which model can provide angular rate and position goals for use in the next algorithm.

Specifically for the tilt axis, referring to FIG. 3, the 'total tilt torque' 337 is estimated using total tilt torque estimator 334, which differentiates the tilt axis measured rate 350a with signal differentiator 334a, then scales the differentiator output by a constant representative of the known structural inertia about the tilt axis 334c using multiplier 334b to form 'total tilt torque' 337.

Finally we subtract known 'supplemental tilt torque' 335 from 'total tilt torque' 337 using subtractor 332 to produce 'net external tilt torque' 333 applied to the tilt axis simulated physical model 331.

For the pan axis, referring to FIG. 4, the 'total pan torque' 347 is estimated using total pan torque estimator 344, which differentiates the measured pan rate 348a with signal differentiator 344a, then scales the differentiator output by a constant representative of the known structural inertia about the pan axis 344c using multiplier 344b to form 'total pan torque' 347.

Finally known 'supplemental pan torque' 345 is subtracted from 'total pan torque' 347 using subtractor 342 to produce 'net external pan torque' signal 343 applied to the pan axis simulated physical model 341.

The remaining sub-algorithm for the pan and tilt axis, the Model Follower will now be described:

In the model follower algorithm the simulated axis physical models 331, 341 become the 'master reference' and provide modeled angular rate and position goals as already described. The entire balanced component assembly becomes the 'slave' which will be nudged or coerced—via the supplemental tilt and pan torques 335, 345 from the torque generator 4—to match the rate and position goals dictated by the simulated physical model master. If the difference between slave and master is kept small enough the total balanced component assembly may respond and feel to the user closely to a real rig with the stability enhanced physical characteristics that the model simulates.

The artificial horizon algorithm 310 provides the measured rate and orientation of each controlled axis of the rig. From here a feedback loop can be formed to produce the final supplemental torque for each axis. Measured rate and orientation of the physical slave is compared to the modeled rate and position goals of the master by subtraction. These differences are scaled and summed to form the final supplemental torque for this axis. More specifically, the following equation can be used:

"Supplemental Torque"=K1 times (modeled_rate minus measured_rate)

plus

K2 times (modeled_angle minus measured_angle)

This equation forms a negative feedback loop wherein the bandwidth and damping of the loop is controlled by optimum choice of the feedback coefficients K1, K2. K1 and K2 are preferably set as large as possible to maximize the fidelity of the slave to the master model. However, all practical inertial sensors have some residual electrical noise that will introduce jitter into the system if these coefficients are set too large; therefore the optimum will vary for various examples of the invention.

The polarity of the "supplemental torque" is chosen such that if the physical slave 'falls behind' the master model a positive "supplemental torque" is produced which advances the slave through torque from the torque generator causing it to catch up with the master, conversely if the slave moves ahead of the model a negative torque at the generator retards the slave so it 'falls back' to the master model's position goal.

Specifically for the tilt axis, in reference to FIG. 3, the model follower 336 is implemented by first subtracting tilt axis measured rate 350a from modeled tilt rate signal 331h forming difference 336f using subtractor 336a. Secondly, tilt axis measured angle 350b is subtracted from modeled tilt angle 331j forming difference 336g using subtractor 336d. Finally differences 336f, 336g are scaled by constants Kt1, Kt2, respectively using constant multipliers 336b and 336e, respectively and summed via adder 336c to form final supplemental tilt torque 335.

For the pan axis, in reference to FIG. 4, the model follower 346 is implemented by first subtracting pan axis measured rate 348a from modeled pan rate signal 341h forming difference 346f using subtractor 346a. Secondly, pan axis measured angle 348b is subtracted from modeled pan angle 341j forming difference 346g using subtractor 346d. Finally differences 346f, 346g are scaled by constants Kp1, Kp2, respectively using constant multipliers 346b and 346e, respectively and summed via adder 346c to form final supplemental pan torque 345.

This completes the basic axis algorithm applied individually to the pan and tilt axes for this illustrative embodiment of the invention.

Additional Aspects of the Pan and Tilt Axis Algorithms

The practical shortcomings of the described standard "physical simulation model plus model follower" algorithms may be addressed by various illustrative embodiments of the invention. The aforementioned algorithms are effective for as long as the generated supplemental torques remain large enough to overcome the strength of the operator's applied torque and will thus keep the physical rig substantially aligned with the model.

For any practical realizations of the invention, the omni-axial torque generator 4 may be of limited maximum torque due to size and weight limitations of the practical torque motors employed.

Assume for example the standard conventional algorithm is simply employed as described previously:

If the operator applies an ever increasing torque, the 'slave' (physical structure) will faithfully follow the 'master' model and the apparatus will accurately provide the desired stability features of inertia enhancement and friction until the omni-axial torque generator 4 reaches its maximum available torque. At that point the 'feel' of the balanced component assembly suddenly changes because there is not enough additional supplemental torque available to coerce the rig to match the model. The balanced component assembly will instantly lose synthesized inertia and will begin to speed up unexpectedly as the operator continues to apply more torque. As orientation of the physical structure races ahead, it begins to significantly outpace the model's positional goal. The operator finally senses the change in feel and instinctively begins to reduce or release completely his/her torque applied to the rig. The torque generator feedback loop eventually comes out of saturation and senses that the balanced component assembly is angularly way ahead of the model's position goal so it applies a maximum torque in the opposite direction coercing the physical rig to rapidly 'fall back' to match the model. This produces, what some may find as an annoying and clearly unacceptable 'servo-instability' or 'reverse spring back' physical behavior as the algorithm strives to reestablish a positional match between physical rig and model.

Illustrative embodiments of the invention address the above shortcomings. Rather than employing the standard physical model with a fixed modeled moment of inertia and fixed coefficient of dynamic braking friction, instead the system automatically reduces the above two model parameters over time in response, for instance, to a function of increasing measured angular rate about each controlled axis.

Thus, as the operator applies constant torque about a selected axis, the measured angular rate about that axis gradually increases and the modeled moment of inertia and dynamic braking strength are gradually reduced. This causes the physical rig to begin to accelerate more quickly than expected but gradually enough so as to produce a timely cue sensed by the operator allowing him/her to reduce applied torque before the torque generator reaches maximum and possibly deleterious results occurs.

Should the operator ignore the above cueing feedback feature, the noted unacceptable 'spring-back' effect can be further mitigated by first sensing when an axis torque generator reaches its maximum torque saturation point. When this occurs the simulated physical model's angular position goal is overridden and replaced with one that lags the physical angular position by a constant amount equal to the model to physical difference that existed when saturation occurs. This modification can ensure that the modeled to physical angular position disparity remains small enough that little or 'no spring-back' occurs when the operator finally releases control of the handle.

Preferably the result of these novel modifications to the simulated physical model is that the stabilized structure of embodiments of the invention respond to the operator's inputs in a repeatable and controllable way such that although it may not necessarily respond ideally—with fixed enhanced inertia plus friction—it still may be entirely productive in the hands of even an inexperienced operator.

Specifically for the tilt axis, in reference to FIG. 3; The tilt axis modifications are implemented by first reducing the 'tilt axis coefficient of dynamic braking' within the dynamic braking model 331b in response to modeled tilt angular rate signal 331h increases. Further, the modeled moment of inertia Imt within divider 331s is reduced as modeled tilt rate signal 331h increases. This provides the described desired operator cue. Secondly a 'torque saturation detector' 331f indicates when the tilt axis torque generator 420 reaches its maximum value, and in response toggles switch 331e to its downward position, replacing modeled tilt rate signal 331h with tilt axis measured rate 350a to the integrator 331g input via switch 331e output 331p connected to said integrator input. This has the desired effect of causing modeled tilt angle 331j to lag or lead tilt axis measured angle 350b by no more than the difference that existed when saturation occurred, as needed to prevent spring-back instabilities about the tilt axis.

Similarly for the pan axis, in reference to FIG. 4; The pan axis modifications are implemented by first reducing the 'pan axis coefficient of dynamic braking' within the dynamic braking model 341b in response to modeled pan angular rate signal 341h increases. Further, the modeled moment of inertia Imp within divider 341s is reduced as modeled pan rate signal 341h increases. This provides the described desired operator cue. Secondly another 'torque saturation detector' 341f indicates when the pan torque generator 430 reaches its maximum value, and in response toggles switch 341e to its downward position, replacing modeled pan rate signal 341h with pan axis measured rate 348a to the integrator 341g input via switch 341e output 341p connected to said integrator input. This has the desired effect of causing modeled pan angle 341j to lag or lead pan axis measured angle 348b by no more than the difference that existed when saturation occurred, as needed to prevent spring-back instabilities about the pan axis.

Although the independent stabilizing algorithms have each been described as assigned to a separate physical axis of rotation of the rig, the scope of embodiments of the invention include an alternative that simultaneously models the physical motion of a three dimensional structure in all of its possible rotations, notwithstanding potentially different angular inertias among its axes. A combined algorithm creates the stability enhancements via a three dimensional corrective torque vector applied through the omni-axial torque generator attached to the rig's gimbal. The torque vector aligns with the axis (in three dimensions) about which the torque is to be coupled and has length representing the quantity (clockwise or counterclockwise) of generator torque to be coupled between the 'operator' side and the 'payload' side of the gimbal.

Another observed and generally undesired behavior of the described roll, tilt, pan algorithms is noted and addressed in embodiments of the invention by further modifications: Specifically, as the physical structure is tilted to a high angle of tilt approaching 90 degrees, known as a the 'zenith' angle the previously described roll horizon leveling algorithm approaches a singularity where its mimicry of the standard pan-tilt mount breaks down and becomes unproductive.

If you observe the behavior of a passive conventional ground based pan-tilt head that can reach 90 degrees of tilt an interesting phenomenon occurs as it approaches the tilt 'zenith': Pushing on the pan-tilt handle in the 'pan' direction increasingly 'rolls' the camera about its roll axis and at true zenith the mechanism locks and camera-referenced pan is no longer possible. While at zenith you are still able to tilt away from zenith and roll about the camera's roll axis but can no longer pan about the camera's pan axis. This behavior, commonly referred to as 'gimbal lock' is avoided in conventional pan tilt mounts as they are constrained to somewhat less than +/−90 degree tilt range.

As exemplary embodiments of the invention are freely hand carried there is little or no physical way to avoid operator tilts through zenith, furthermore the traditional body carried Steadicam®-type mount allows controllable tilt orientation through zenith as the operator can position the gimbal to avoid gimbal lock since said gimbals' axes are not constrained to align with those of the camera.

Therefore, alternate algorithmic rules are justified and can be beneficial to embodiments of the invention.

Roll Axis Modification for Extreme Tilt Angles:

For a range of tilt angles, say within +/−80 degrees or so of horizontal the described roll axis leveling algorithm prevails. Beyond a predetermined angle as zenith is approached the roll axis drive to horizontal is gradually reduced in feedback strength and is gradually replaced with an 'inertial only' algorithm which tends to maintain the current camera roll angle. Embodiments of the invention anticipate either relying on the physical structure's passive roll inertia and further anticipate transitioning to a roll axis active inertial enhancement similar to that provided by described pan/tilt inertial enhancement algorithms.

Specifically, for the roll axis, in reference to FIG. 5; the tilt axis measured angle 350b is applied to a function generator 327, which as shown produces a variable gain signal output 328, which reduces gain to zero as tilt angles approach zenith and 180 degrees away from zenith. Variable gain signal output 328 is applied to multipliers 323, 324 reducing the roll torque feedback strength as zenith, anti-zenith angles are approached.

Pan Axis Modification for Extreme Tilt Angles:

The pan axis algorithm as described is responsive to an earth oriented measure of pan rate and angle provided by the artificial horizon algorithm. Said measured earth oriented pan axis being substantially aligned vertically to local gravity. As a hand held or body carried physical structure, for example, is tilted to zenith said earth pan axis is no longer reasonably aligned with the camera's pan axis and indeed approaches a 90 degree orthogonal relationship. Therefore, embodiments of the invention, upon sensing a tilt angle beyond a set 'extreme' threshold modifies the pan axis algorithm to be increasingly responsive instead to a measured angle and rate oriented to the camera's own pan axis. Thus, the pan axis algorithm, at extreme angles of tilt, stabilizes the camera about its own pan axis and not an earth based axis. This beneficially 'unlocks' the pan axis from the strict earth based pan-tilt mount model and its undesired gimbal lock behavior.

Indeed and of note it has been discovered that if the pan torque generator's axis is reasonably well aligned with the natural pan axis of the camera, a measure of pan rate and orientation may be continuously provided to the pan axis algorithm from inertial sensors aligned to the camera pan axis, rather than an earth-aligned axis. Said arrangement may naturally handle pan behavior for all angles of tilt including the 'through zenith' tilt angle situation noted above without algorithm modifications responsive to tilt angle.

To achieve the aforementioned pan axis modification, referring to FIG. 4; the earth-referenced pan axis measured rate and angle 350c, 350d are replaced with camera-referenced pan axis measured rate and angle 210e, 210d, respectively when measured tilt angle 350b of FIG. 2 exceeds a selected threshold. Or if pan torque generator axis is reasonably aligned with the camera's pan axis, the earth-referenced pan axis measured rate and position 350c, 350d is permanently replaced with camera-referenced pan axis measured rate and angle 210, 210d and input them to the pan axis algorithm of FIG. 4. More specifically, again referring to FIG. 4, standard cross fade elements 348e, 348d are employed to gradually replace earth-referenced pan axis measured rate and angle 350c, 350d with camera-referenced pan axis measured rate and angle 210c, 210d, respectively, as a function of measured tilt angle 350b as determined by function generator 348f, which produces a selected cross fade fraction 348e. The aforementioned cross fade elements operate by multiplying a first input by the selected fraction of between zero and one and multiplying a second input by one minus the selected fraction and summing the two products.

Passive Trans-Gimbal Couplings

Particularly for the handheld embodiment of the invention, further productive modifications can be made that enable single handed support plus orientation. An elastic coupling between an outer handle and inner assembly can provide a 'soft end stop' property which directs the camera payload to smoothly accelerate angularly if the operator rotates the handle beyond the gimbal's maximum angular range, particularly for the roll and tilt axes where limited angular range voice coils are typically employed. An example of such devices can be found in U.S. patent publication 2011/0080563A1, such devices as described, incorporated herein by reference. An exemplary embodiment of the invention has unlimited pan angle rotation range, but an elastic coupling across the pan axis has also been shown to productively allow one handed carrying plus orientation. Said one-handed mode of operation is particularly useful when the operator's free hand is needed for steering a vehicle or the like. The algorithms disclosed herein can be applied to such an elastically coupled pan axis torque generator.

Modifications for a Remotely Controlled Embodiment/Variant of the Invention:

As previously described, embodiments of the invention primarily enhance stability for operators of the stabilizing equipment directly and locally controlling it hands-on. A remotely controllable variant, however, can be implemented producing the described stability features for a remote camera platform.

Many applications demand the orientation of a camera payload where it is impractical, impossible, or dangerous for the operator to be at the camera's location to orient it. Numerous prior art devices exist that allow camera remote control.

In a first remote control application of the invention the typical passive remote control joystick or the like is employed. The joystick's signals are converted to represent torque commands and these transmitted commands are summed with those already provided by the feedback controller as previously described, said sums passed to the omni-axial torque generator. As a result the joystick-based torque commands replace those of a hands-on operator.

In a second enhanced remote controlled application of the invention the aforementioned passive joystick or the like is replaced with a so called 'force feedback', or 'haptic feedback' input device. In embodiments of the invention said device is driven reflectively in a powered fashion by actual camera orientation angles provided via feedback from the invention's artificial horizon algorithm. Advantageously, a remote operator now has in hand a control surface with which to orient the remote platform mounted camera in a way that may be indistinguishable from that provided for a hands-on operator of embodiments of the inventive stabilizer or indeed a conventional passive Steadicam® device.

The described feedback controller 3 provides 'supplemental' torque signals, one for each axis to be controlled through the final essential submodule:

4: Omni-Axial Torque Generator:

The omni-axial torque generator subassembly is coupled to the omni-axial gimbal of the 'sled' of the stabilizer assembly 1, and responsive to the 'supplemental torque' signals provided by the algorithmic feedback controller 3.

The omni-axial torque generator is coupled between the supported side of the gimbal and the payload side. It couples orienting torques, through the gimbal, between the "sled" plus supported camera payload and the support side in parallel with those of the operator.

This subassembly may employ various methods and components but resulting torques are preferably precisely controllable and uniform despite any angular position of the gimbal. Candidate torque generators include conventional permanent magnet DC motors driven by constant current power amplifiers, and 'voice coil actuators' which are simply single coil permanent magnet DC motors that rotate less than a full turn.

In an exemplary embodiment of the invention, a chosen torque generator or motor is attached to each rotatable joint of the gimbal so that torques may be coupled between the stationary side of that joint and its rotating side. Preferably the motors are arranged so their weight does not unbalance the neutral balance of the assembly and the motor body positioning does not interfere with the operator's access to the control handle/guide.

Since the feedback controller 3 develops correctional supplemental torques referenced to the camera payload's primary axes (pan, tilt, and roll), the omni-axial torque generator must take this into account. Some gimbal arrangements have axes of rotation that do not necessarily align with those of the camera. Only the gimbal pan axis of this arrangement aligns with camera's pan axis. The other two axes of the gimbal instead align with the center of balance of the camera and all its counter-balancing masses.

A first rotary joint attaches to the operator support, a second rotary joint, the axis of which is perpendicular to that of the first joint, attaches to the rotating side of the first joint and finally the rotating side of second rotary joint attaches to the stationary side of the pan axis joint, the axis of which is substantially perpendicular to both first and second joint axes, with the camera payload attached to the rotating side of the pan joint. As the camera is panned its roll and tilt axes rotate with respect to the first joint and second joint axes.

Therefore, the supplemental correction torques produced by the feedback controller 3 must be rotated said torques aligned to camera payload 110 roll and tilt axes, and instead align them with the actual first joint, second joint axes. This is readily achieved by the feedback controller 3 provided it receives the current angle of the pan joint via an attached angle sensor generated signal.

For the handheld embodiment of the invention the order is reversed of the axis joints as is conventionally done. Referencing FIG. 2, the stationary side of a roll axis torque generator 410 is attached to the platform 120 with its axis substantially parallel to the camera's roll axis. The rotor coil assembly 411 is attached to roll/tilt guide 140, attached to tilt rotor coil assembly 421 of the tilt rotary joint, having an axis substantially perpendicular to that of the roll joint. Finally, the stationary side of the tilt axis torque generator 420 is attached to the rotating side of the pan torque generator output shaft 431, the axis of which is substantially perpendicular to those of both the roll and tilt joints, said pan rotary joint embedded in a pan axis torque generator that also serves as a handle 430 carried in the operator's hand.

In this embodiment, the axes may be well enough aligned with those of the camera that the feedback controller 3 provided roll, tilt, and pan correctional supplemental torques may be applied directly through torque generators 4 attached to corresponding rotary joints of the gimbal without the need for rotary joint angle sensing.

In one such preferable handheld embodiment, referring now to FIGS. 1 and 2 the omni-axial torque generator 4 is implemented for the roll and tilt axes of the gimbal using voice coil motors for roll and tilt axis torques generators 410, 420 with the stator, rotor of each motor corresponding to the stationary, rotary sides of the described roll, tilt axis joints. Finally, the pan axis torque generator 430 is implemented with a standard DC motor embedded inside the operator's hand carried handle that contains pan axis torque generator 430, the pan torque passing between the handle and the connected tilt rotary joint 420 attached to the remaining rig structure.

Figure 6:
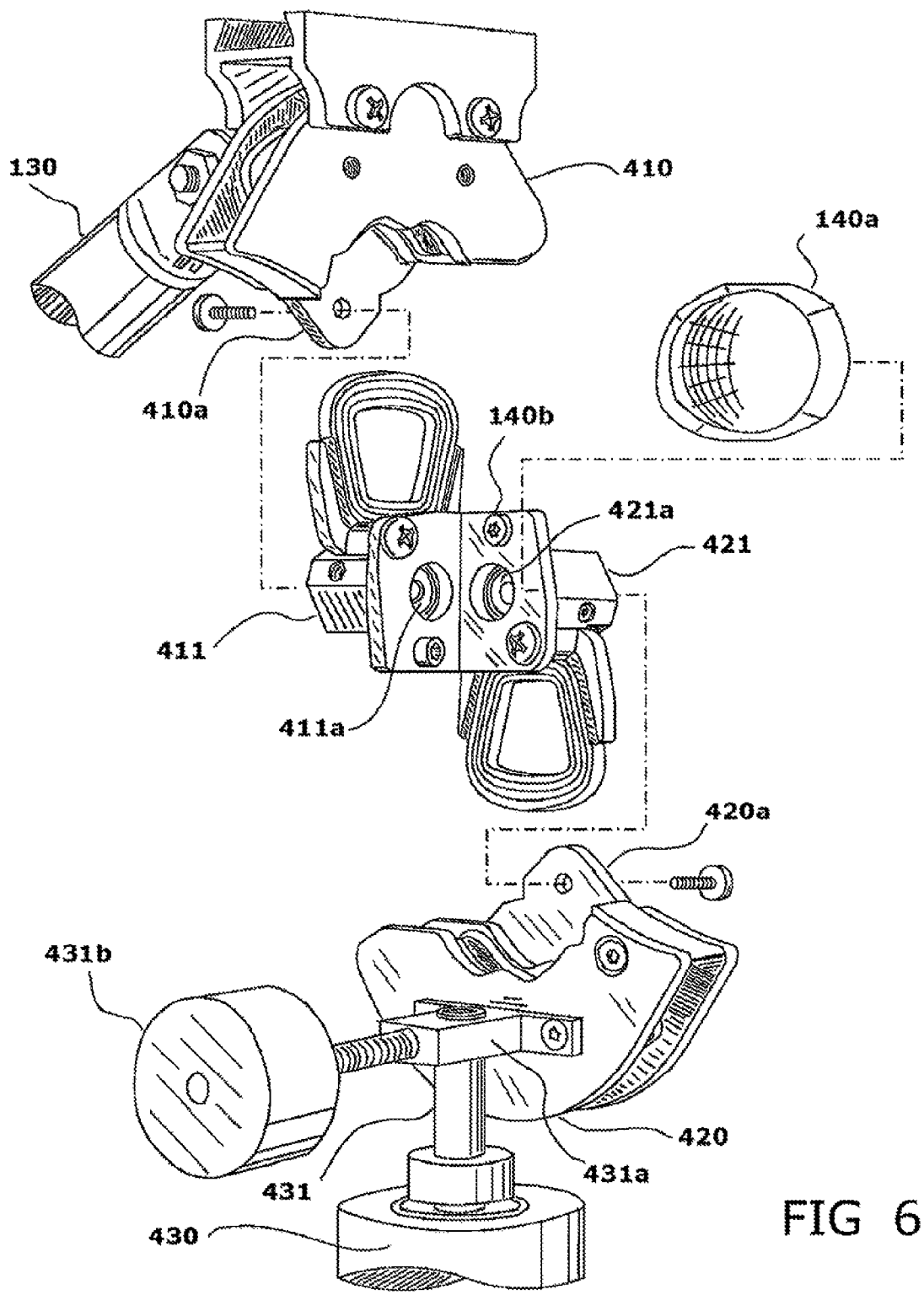
FIG. 6 and FIG. 7 are exploded views of an illustrative embodiment of the invention.

To further understand the gimbal arrangement of the roll and tilt axes for the preferred handheld embodiment, refer to FIG. 6 which shows an exploded view. As shown, the roll axis employs a rotary voice coil motor as a roll axis torque generator 410 with its stationary or stator side fixedly attached to the camera side of the physical structure, and its rotor coil assembly 411 attached to right angle plate 140*b*. Shown within the rotor coil assembly 411 is a standard radial bearing 411*a* whose inner side is fastened to plate 410*a* with a screw to the stator of roll axis torque generator 410 as shown. The outer side of the bearing 411*a* within rotor coil assembly 411 is fixedly attached to the combined assembly 411, 140*b*, 421. The central axis of bearing 411*a* within rotor coil assembly 411 nominally or precisely coincides with the gimbal's axis of roll.

Similarly, the tilt axis employs a voice coil motor as a tilt axis torque generator with its stator side fixedly attached to the pan torque handle assembly containing pan axis torque generator 430 pan torque generator output shaft 431 via coupling block 431*a*. Tilt rotor coil assembly 421 is fixedly attached to the right angle plate 140*b*. Shown within the tilt rotor coil assembly 421 is a standard radial bearing 421*a* whose inner side is fastened to plate 420*a* with a screw to the stator side of tilt axis generator 420 as shown. The outer side of the bearing 421*a* within tilt rotor coil assembly 421 is fixedly attached to the combined assembly 411, 140*b*, 421.

The central axis of the outer side of standard radial bearing 421*a* within tilt rotor coil assembly 421 substantially coincides with the gimbal's axis of tilt.

By construction of the right angle plate 140*b* the axes of roll and tilt and those of their respective bearings 411*a*, 421*a* intersect at or near the physical rig's 1 center of gravity. Furthermore, the axis of pan is preferably coincident with the central axis of the pan torque handle output shaft 431 with said axis nominally or precisely passing through the intersection of said roll and tilt axes. Counterweight 431*b* substantially balances the weight of assemblies 421, 420 such that their common center of gravity is substantially coincident with said axis of pan, allowing the balanced component assembly center of gravity substantially coincident with the gimbal axes' intersection.

Operator control surface 140a is attached to right angle plate 140b. Control surface 140a is for example a textured partial sphere with its center substantially coincident with the roll, tilt, pan axes intersection and the physical rig 1 center of gravity. Other types of operator control interfaces are within the scope of the invention. Various types of gimbals and other devices allowing analogous or comparable degrees of freedom can also be implemented with methods and assemblies of the invention.

An operator may apply pan and tilt steering torques to said textured sphere to orient the supported camera payload. As constructed the control surface 140a of this handheld embodiment only allows operator orientation in the pan and tilt directions, as the roll axis is automatically maintained level by the roll axis algorithm 320.

For the preferred handheld embodiment, as described previously the pan axis torque generator 430 is implemented within the operator carrying handle by employing for instance a common permanent magnet DC (PMDC) motor. Stabilizers exist that allow unlimited rotation of a pan rotary joint within an operator carrying handle, beneficially allowing the operator to 'walk around' the stabilizer to assume an optimum operating position without needing to re-grip the handle as the stabilizer continues to point in a particular desired angular direction. We achieve this feature while employing the low cost PMDC motor as shown in the arrangement of FIG. 7.

Figure 7:
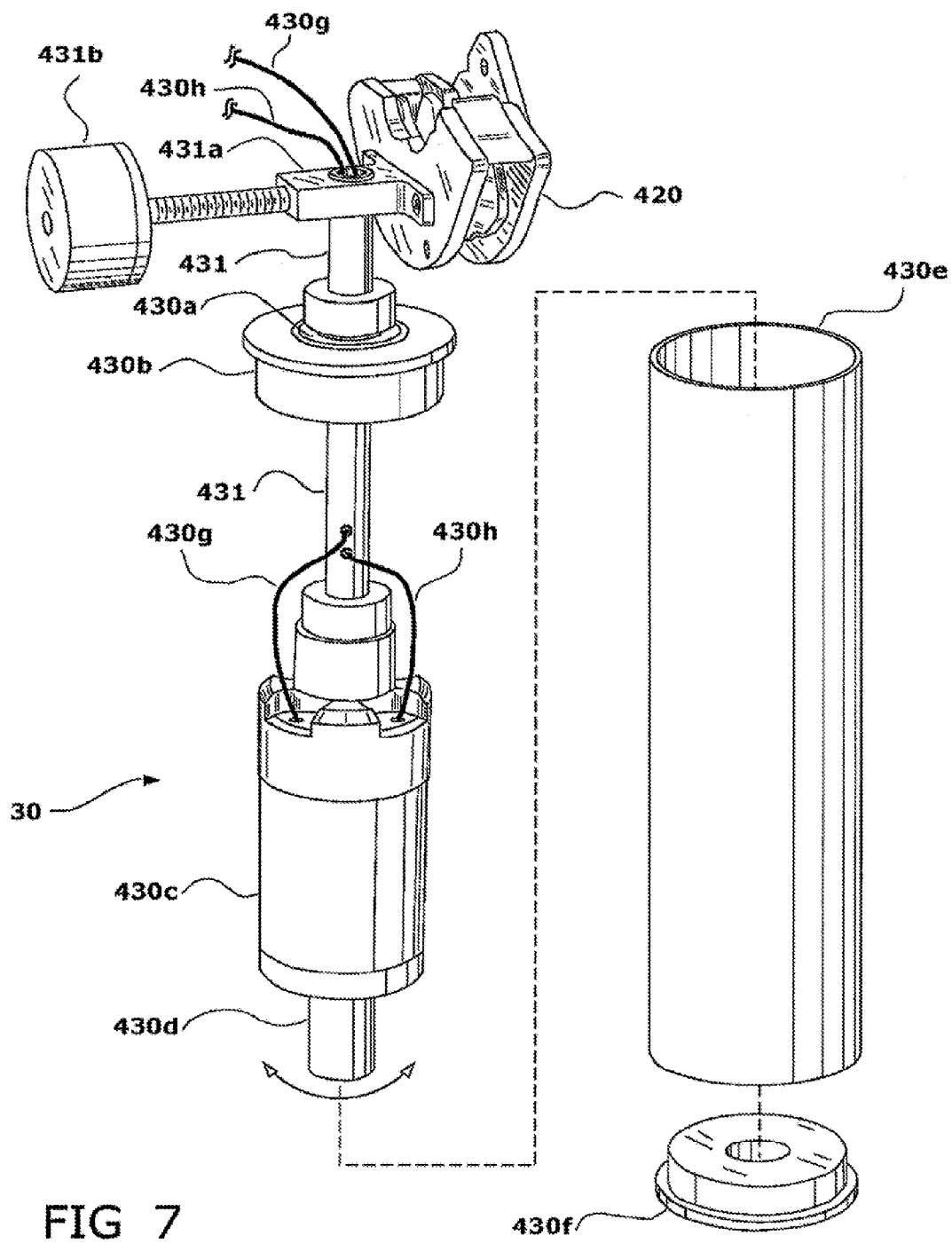

Referring now to FIG. 7: The stator body of a standard PMDC motor 430c is fixedly attached to pan torque generator output shaft 431, said shaft preferably hollow as shown. Power wires 430g, 430h for said motor 430e enter said hollow shaft 431 and exit said shaft as shown to connect power to motor 430c. A top end cap 430b with embedded standard radial bearing 430a freely rotates about shaft 431 while fixedly engaging top end of handle shell 430e. Finally a bottom end cap 430f fixedly engages handle shell 430e bottom end while motor 430c output shaft 430d passes through a central hole in bottom end cap 430f central hole and is fixedly engaged thereto.

Thus, the handle shell 430e, carried in the operator's hand, is freely and unlimitedly rotatable about the pan axis output shaft 431 without twisting the motor 430c power wires 430g, 430h.

Further embodiments of the invention provide alternative or additional means to address bottom-heaviness of a balancing apparatus. Maintaining 'level' (the true correspondence of the sled 'roll' axis to the local horizon), and 'headroom' (the necessary tilt angle to maintain the desired shot), are two tasks that an operator generally desires to accomplish. Both tasks are conventionally assisted by operating with the gimbal position adjusted to be centered slightly above the center-of-balance of the entire sled. Absent any significant lateral accelerations, this results in slight bottom-heaviness.

Bottom-heaviness typically causes pendularity during lateral accelerations such as starting, stopping or cornering; and any subsequently desired change from that nominal tilt angle is difficult to consistently maintain.

Nevertheless, the tilt and roll feedbacks from this elective bottom-heaviness are often taken to be so essential, that operators learn to apply the momentary angular counter-pressures required to neutralize pendularity. This typically takes significant skill. Embodiments of the invention provide an alternative means to address this phenomenon.

A further embodiment of the invention provides a 'power-assisted gimbal' replacement for conventional stabilizing apparatus gimbal assemblies, employing the substantially acceleration-proof angular detection methods and hardware as described herein in other embodiments, coupled with a novel means for applying appropriate assistive torques to at least two gimbal/yoke axes, despite the fact that the angles are likely to be variously and persistently decoupled from the fixed sled axes of 'roll' and 'tilt'.

Previously noted embodiments have substantially fixed axes of torque applied, unlike traditional stabilizing apparatus gimbal yokes, which are momentarily positioned anywhere around the axis of the sled center post, according to the demands of the shot, and any 'torque' assistance applied to these gimbal axes must proportionally take these discrepantly shifting angular orientations into account for useful correction. The further embodiment of the invention, various aspects of which can be used with other embodiment elements, therefore adds an optical, digital or analogue counter around the sled 'pan' axis that tracks the momentary position of a conventional stabilizing apparatus gimbal yoke, even as the operator moves his body, and thus the yoke, around the rig, from side to front to back, while obtaining his or her shots. This pan-axis counter, along with an associated new algorithm, therefore tracks the proportion between the sum and angular directionality of the gimbal torques as their momentary relationships vary with respect to the 'roll' and 'tilt' axes of the actual sled.

The counter hardware and software algorithms of this embodiment of the invention track this angular relationship to appropriately power and vector the output of torque generators operating, respectively, around the conventional yoke trunnion bearings ("tilt") and the perpendicular bearing axis of the yoke itself ("roll"). This permits the sled to be neutrally balanced, and therefore, non-pendular—and yet still provides direct net torque assistance to maintain level for the sled, and additionally maintain desired 'headroom' by continuously powering the 'tilt' axis angle.

FIG. 9, which will be described in more detail below, shows the relative percentage and direction of torque required for trunnion ("tilt") motors vs. yoke ("roll") motors to continuously influence the roll axis to the right as the yoke moves 360° around the pan bearing. Note the central arrows indicating the 'forward' direction for each iteration.

The percent allocation of the torques to the generators is a torque vector rotation. We want to rotate a roll, tilt torque vector referenced to the camera (or other payload being balanced) as produced by the algorithms to a new roll, tilt torque vector aligned with the actual gimbal torque generators, which are attached to and aligned with the operator side of the rig. The torque vector rotation is related directly to the pan angle.

Figure 8:
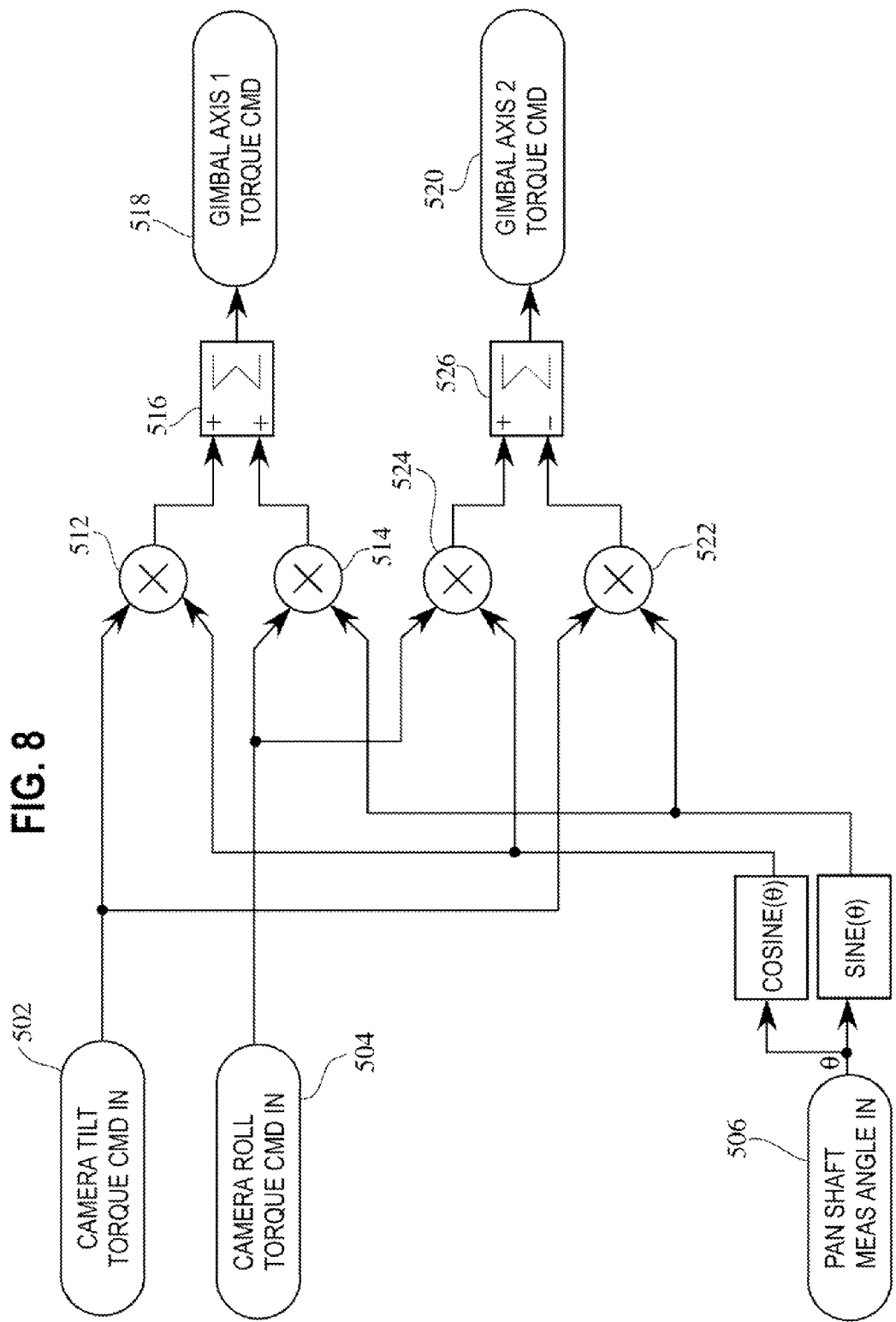
FIG. 8 is a flow chart representing the calculation of actual torques to be generated by the roll and tilt motors.

The standard equation for rotating a two dimensional (2D) vector, as represented in FIG. 8, is:

$$X'=X*\cos\theta - Y*\sin\theta$$

$$Y'=X*\sin\theta + Y*\cos\theta$$

where X, Y are desired supplemental torque signals from the algorithm to be applied to payload aligned roll, tilt axes respectively. X', Y' are actual torques to be generated by the gimbal "roll" and "tilt" motors, respectively, attached to operator side roll, tilt gimbal axes, respectively.

$\theta$ is an angular portion of a 360 degree measure of the pan bearing rotation and is zero when gimbal "roll" axis aligns with payload roll axis and gimbal "tilt" axis aligns with payload "tilt"

The degree of pan bearing rotation can be sensed by any known method compatible with the apparatus and its use. Examples include: standard linear potentiometer, sine cosine potentiometer, angular resolver (magnetic angle sensing using rotor and stator coils) and optical encoder, both the relative type, for which an angular reset is required, and absolute type, which delivers an angle signal without any reset means required.

Turning to FIG. 8, calculation of the actual torques to be generated by the roll and tilt motors will be described. Block 502 indicates the supplemental payload tilt torque value "Y" and block 504 indicates the supplemental payload roll value "X". Block 506 provides the pan shaft angle θ. Steps 508 and 510 show cosine θ and sine θ, respectively. The payload tilt torque value "Y" is multiplied by cos θ in step 512. In step 514, the payload roll torque value "X" is multiplied by sin θ. The results generated in steps 512 and 514 are summed in step 516 to obtain the actual torque Y' to be generated by the gimbal tilt motor as provided in block 518.

Figure 9A:
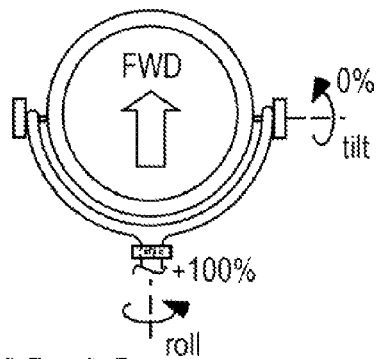
FIGS. 9A-H show mix factors for roll and tilt with pan axis angles of 0, 45°, 90°, 135°, 180°, 225°, 270° and 315°.
Figure 9B:
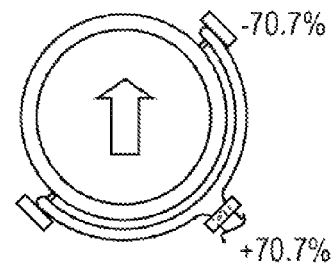
Figure 9C:
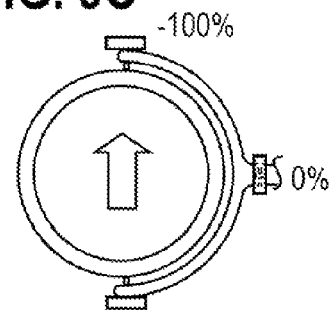
Figure 9D:
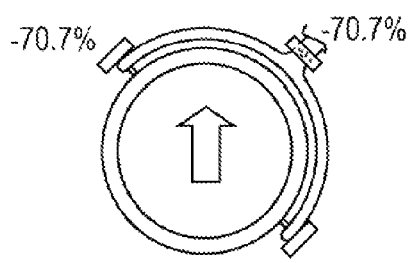
Figure 9E:
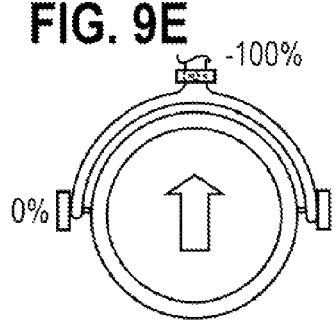
Figure 9F:
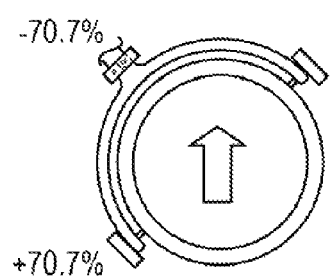
Figure 9G:
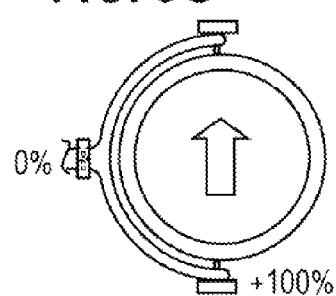
Figure 9H:
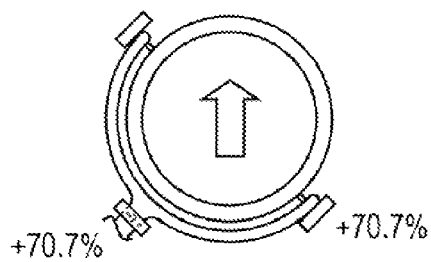

The actual torque to be generated by the gimbal roll motor is depicted by block 520 and obtained by the following steps: The supplemental payload tilt torque "Y" from block 502 is multiplied by sin θ in step 522. The supplemental payload roll torque "X" is multiplied by cos θ in step 524. In step 526, the result from step 522 is subtracted from the result generated in step 524 to obtain the actual torque "X" in block 520.

if you plug in 0, 90°, 180°, 270° for θ into the above equations you will get the mix factors shown in FIGS. 9A, 9C, 9E and 9G, respectively. FIG. 9A depicts the mix factor values when the gimbal roll and tilt axes are aligned with the payload roll and tilt axes, +100% for the roil axis and zero for the tilt axis. θ=0 in this configuration so no adjustment is needed. FIG. 9c depicts a configuration were θ=90°, which corresponds to factors of zero for the roll axis and −100% for the tilt axis. FIG. 9E represents the configuration when θ=180°, wherein the factors are zero for the tilt axis and −100% for the roll axis. At θ=270°, the tilt factor is +100% and the roll factor is zero as shown in FIG. 9G. Additional increments of 90° from the initial 45° are depicted in FIGS. 9D, 9F and 9H, wherein the mix factors in FIG. 9D (θ=135°) are −70.7% for both the roll and tilt axes; the mix of factors in FIG. 9F (θ=225°) are +70.7% for the tilt axis and −70.7% for the roll axis; and the factors for both the tilt and roll axes in FIG. 9H (θ=315°) are +70.7%. At 45° you obtain +70.7% for the roil axis, and −70.7% for the tilt axis, as represented in FIG. 9B. This makes sense as at 45° the torque motors have less mechanical advantage and each needs more torque to achieve the final algorithm-requested torque referenced to the payload axes, now rotated 45° away from torque generator axes.

Since gimbal torques are applied 90° apart they are not additive but instead obey a vector addition equation:

$$T_{total} = \sqrt{T_{roll}^2 + T_{tilt}^2}$$

wherein:

$$1 = \sqrt{0.707^2 + 0.707^2}$$

Utilizing the various calculations and apparatus described above, the tilt axis can be preset for a desired 'headroom' just as the roll axis is automatically preset to seek level.

The invention may be embodied in a variety of ways, for example, a system, method or device. The invention includes the methods as described herein, and processors to carry out the methods, including storage devices and components and any associated program code.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention for example by implementing the invention for payloads other than cameras. Accordingly, it is intended that the invention not be limited to the specific illustrative embodiments, but be interpreted within the full spirit and scope of the appended claims and their equivalents.

The invention claimed is:

1. A method of stabilizing a balanced component assembly having a plurality of torque generators, the method comprising:
   (a) using one or more angular motion sensing units, measuring and providing angular rates and orientation motions of the balanced component assembly about three substantially mutually orthogonal axes, wherein such angular rates and orientation motions include that which is produced by operator input and external disturbances;
   (b) providing a physical model comprising selected angular rates and orientation motions for the three substantially mutually orthogonal axes;
   (c) comparing, using a signal processor, the measured angular rates and orientation motions to the modeled angular rates and orientation motions, respectively, for each of the three substantially mutually orthogonal axes, to create a comparison for each of the substantially mutually orthogonal axes;
   (d) generating a supplemental torque signal for each of the substantially mutually orthogonal axes based on the respective comparisons derived in step (c);
   (e) applying each of the supplemental torque signals to a respective torque generator;
   (f) repeating step (a) through (e) to form a feedback loop.

2. The method of claim 1 comprising:
   comparing, using a signal processor, the measured angular rates and orientation motions to the modeled angular rates and orientation motions, respectively, for each of the three substantially mutually orthogonal exes, using a separate algorithm for each of the substantially mutually orthogonal axes to create a comparison for each of the substantially mutually orthogonal axes.

3. The method of stabilizing a balanced component assembly of claim 1 wherein the three mutually orthogonal axes correspond to pan, tilt and roll.

4. The method of stabilizing a balanced component assembly of claim 1 wherein the measured angular rates and orientation motions provided by the angular motion sensing unit are vehicle referenced, the method further comprising:
   converting the vehicle-referenced angular rates and orientation motion to earth-referenced angular rates and orientation motion using an artificial horizon algorithm.

5. The method of stabilizing a balanced component assembly of claim 1 wherein the supplemental torque signal increases the angular inertia of the rig.

6. The method of stabilizing a balanced component assembly of claim 3 further comprising:

adding static torque and frictional torque referenced to a fixed inertial frame to the modeled tilt torque and modeled pan torque of the physical model.

7. The method of stabilizing a balanced component assembly of claim 1 wherein the moment of inertia and coefficient of dynamic braking friction are automatically reduced over time as a function of increasing measured angular rate about each substantially mutually orthogonal axis.

8. The method of stabilizing a balanced component assembly of claim 7 further comprising;
providing a threshold torque below a supplemental torque limit;
reducing the supplemental torque when external torque reaches the threshold torque; and
re-applying supplemental torque when the external torque departs from the threshold torque.

9. The method of stabilizing a balanced component assembly of claim 1 wherein the operator input includes torque applied remotely to the omni-axial torque generator by an operator.

10. The method of stabilizing a balanced component assembly of claim 1 wherein:
when the tilt axis angle equals an angle in a selected range, a roll axis leveling algorithm prevails; and
when the tilt axis angle departs from the selected range, an inertial only algorithm prevails.

11. The method of stabilizing a balanced component assembly of claim 10 wherein the selected tilt axis angle range is about +/−80°.

12. The method of stabilizing a balanced component assembly of claim 4 wherein:
when the tilt axis angle equals a threshold angle a pan axis algorithm is modified to be increasingly responsive to a vehicle-referenced angular rate and orientation motion of the pan axis.

13. The method of claim 1:
wherein the plurality of torque generators include a roll generator and a tilt generator; wherein the supplemental torque signals include a supplemental tilt torque value and a supplemental roll torque value;
the method further comprising;
providing a counter programmed to track a pan shaft angle representing the momentary angular position of a yoke of the gimbal as momentary relationships of the gimbal torques vary;
calculating torques to be generated by a roll motor and a tilt motor based on the supplemental tilt torque value, the supplemental roll torque value and the pan shaft angle; and
applying signals to the roll and tilt torque generators based on the calculated torques.

14. An apparatus for stabilizing a payload comprising:
a rig having a gimbal;
the gimbal having an omni-axial torque generator;
the omni-axial torque generator comprising a roll torque generator, a tilt torque generator and a pan torque generator;
a feedback controller;
the omni-axial torque generator driven by a supplemental torque output signal generated by the feedback controller;
an angular motion sensing unit capable of measuring angular rates and orientation motions produced by the omni-torque generator wherein the angular rates and orientation motions include that which is produced by external disturbances;
the feedback controller having a signal processor functionally connected to the angular motion sensing unit to receive as an input the measured rates and measured orientations;
the signal processor including:
an artificial horizon algorithm;
a first axis algorithm;
a second axis algorithm; and
a third pan axis algorithm;
the signal processor, by the respective algorithms, capable of processing the measured angular rates and orientation motions to produce the supplemental torque signals to be applied to each of the first, second and third axes, which when applied modify the angular rates and angular orientations to conform to a physical model.

15. The apparatus of claim 14 comprising an operator-control surface for controlling motion about the second axis and the third axis, wherein motion about the first axis is controlled by the feedback controller only.

16. The apparatus of claim 14 comprising:
a handle assembly;
the handle assembly having a shell rotatable about a hollow third torque generator shaft;
a motor fixedly attached to the third torque generator shaft;
wires disposed within the third torque generator shaft and connected to the motor;
a top end cap freely rotatable about the third torque generator shaft while fixedly engaged to the shell;
a bottom end cap fixedly engaged to the shell bottom end, the bottom end cap having a hole therein in which third torque generator is disposed and fixedly attached;
the arrangement allowing the shell to be substantially unlimitedly rotatable about the third axis output shaft without twisting the wires.

17. The apparatus of claim 14 wherein the omni-axial torque generator generates torque about the first, second and third axes, which are mutually orthogonal and correspond to pan, tilt and roll.

18. The apparatus of claim 14 wherein the algorithms add static torque and frictional torque referenced to a fixed inertial frame to the modeled second torque and modeled third torque of the physical model.

19. The apparatus of claim 14 comprising a remotely controlled omni-axial torque generator controlled by operator input.

20. The apparatus claim 14 further comprising a passive-trans-gimbal coupling, wherein the passive-trans-gimbal coupling provides additional external torque.

21. The apparatus of claim 14 further comprising:
a pan-axis counter programmed to track the proportion between variations in sum and direction of gimbal torques with respect to two of the axes, the two axes corresponding to roll and tilt.

22. A method of stabilizing a balance component assembly having a pan shaft and a gimbal, the gimbal having a yoke and a plurality of torque generators, the torque generators including a roll motor and a tilt motor, the method comprising:
providing a supplemental tilt torque value;
providing a supplemental roll torque value;
providing a counter around a pan axis programmed to track a pan axis angle representing the momentary angular position of the gimbal yoke as the momentary relationships of the gimbal torques vary;
calculating torques to be generated by the roll motor and tilt motor based on the supplemental tilt torque value, the supplemental roll torque value and the pan shaft angle; and applying signals to the pan and tilt torque generators based on the calculated torques.

23. The method of claim 22 wherein the relative percentage and direction of torque required for tilt motors compared to yoke roll motors is continuously influence.

\* \* \* \* \*